United States Patent [19]
Yoshioka et al.

[11] Patent Number: 5,122,885
[45] Date of Patent: Jun. 16, 1992

[54] MAGNETIC VIDEO RECORDING/REPRODUCING APPARATUS FOR VIDEO SIGNALS OF DIFFERENT ASPECT RATIOS ADAPTER UNIT

[75] Inventors: Atsushi Yoshioka, Yokohama; Yoshizumi Watatani, Fujisawa; Nobuo Azuma, Yokohama; Tadasu Otsubo, Chigasaki; Shuichi Matsuo, Tokyo, all of Japan

[73] Assignees: Hitachi, Ltd., Tokyo; Hitachi Video Engineering Incorporated, Kanagawa, both of Japan

[21] Appl. No.: 475,963

[22] Filed: Feb. 6, 1990

[30] Foreign Application Priority Data

Mar. 1, 1989 [JP] Japan .................. 1-046514

[51] Int. Cl.⁵ .................................. H04N 5/78
[52] U.S. Cl. ............................ 358/310; 358/335; 360/33.1
[58] Field of Search .............. 358/310, 330, 335, 12, 358/141, 140, 11; 366/33.1

[56] References Cited

U.S. PATENT DOCUMENTS 4,651,208  3/1987  Rhodes et al. .................. 358/12
4,698,694  10/1987  Tomita et al. .................. 358/310

FOREIGN PATENT DOCUMENTS 62-84648  4/1987  Japan .
62-84685  4/1987  Japan .

OTHER PUBLICATIONS

Yasumoto et al, A Wide Aspect Ratio Television System With Full NTSC Compatability, Feb. 1988, IEE Transaction on Consumer Electronic vol. 34 No. 1 pp. 121-127.

Primary Examiner—Roy N. Envall, Jr.
Assistant Examiner—Huy Ngugyen
Attorney, Agent, or Firm—Antonelli, Terry, Stout & Kraus

[57] ABSTRACT

In a magnetic video recording/reproducing apparatus having a recording circuit for recording two kinds of video signals for different aspect ratios $a_1$ and $a_2$, where $a_1 > a_2$, a reproduced signal for aspect ratio $a_1$ is subjected to a time-axis processing and then delivered to a monitor television having the aspect ratio $a_2$ in order to avoid a picture on the monitor television from being so distorted as to be elongated vertically. During the time-axis processing, a Y/C interleave set-up processing and a time-axis variation correcting processing are also carried out as necessary. A reproduced signal for aspect ratio $a_2$ is subjected to a time-axis processing and then delivered to a monitor television having the aspect ratio $a_1$ in order to avoid a picture on the monitor television from being so distorted as to be elongated horizontally.

19 Claims, 16 Drawing Sheets

MAGNETIC VIDEO RECORDING/REPRODUCING APPARATUS FOR VIDEO SIGNALS OF DIFFERENT ASPECT RATIOS ADAPTER UNIT

BACKGROUND OF THE INVENTION

This invention relates to a magnetic recording/reproducing apparatus suitable for recording and reproducing two kinds of video signals for different aspect ratios of the screen and a conversion adapter unit suitable for converting a video signal for one screen aspect ratio into a video signal for the other aspect ratio.

In order to improve picture quality and live feeling as obtained with the existing NTSC television system, development of the wide NTSC system in which the aspect ratio of the screen (the ratio of lateral or horizontal length to longitudinal or vertical length) is enlarged has been evolved.

The wide NTSC system considers, to some extent, compatibility with the existing NTSC type television receiver set to allow it to receive video signals of practically acceptable quality.

As disclosed in Japanese Kokois JP-A-62-84684 and JP-A-62-84685, prior art wide screen television systems have been proposed wherein a multiplex video signal for an aspect ratio $a_1$ of, for example, 16:9 in which video information concerning opposite left and right side portions (also called side panels) is time-compression multiplexed is transmitted in contrast to the video signal for an aspect ratio $a_2$ of 4:3 of the existing NTSC type screen. In another approach, a signal for the $a_2$ screen aspect ratio, by which top and bottom portions of the screen are blanked so that an auxiliary signal for resolution improvement is multiplexed at the blank portions, is transmitted.

With the wide screen television practiced in addition to the existing television system, co-existence of two broadcasting systems is, realized. However, both the systems are essentially based on the NTSC system and simply differ in aspect ratio and hence, for example, the same VTR (magnetic video recording/reproducing apparatus) must be compatible with either of the two systems. More specifically, a signal for the existing system video-recorded on a tape must be reproduced so as to be normally displayed on not only the existing 4:3 aspect ratio monitor television but also a future monitor television having an aspect ratio of, for example, 16:9. At the same time, a signal for a future aspect ratio of, for example, 16:9 video-recorded on a tape must be reproduced so as to be normally displayed on not only a future 16:9 aspect ratio monitor television but also the existing 4:3 monitor television.

However, the aforementioned prior art references in no way disclose matters concerning VTR's, leaving behind the following problems which remain unsolved in connection with VTR's.

(1) When a signal for 16:9 aspect ratio video-recorded on a tape is reproduced and processed by the existing monitor television, the horizontal length of a picture on the screen is compressed relative to the vertical length and a picture displayed on the screen is so distorted as to be elongated vertically considerably.

(2) Conversely, when a signal for the existing 4:3 aspect ratio video-recorded on a tape is reproduced and processed by a future monitor television of, for example, 16:9 aspect ratio, the horizontal length of a picture on the screen is expanded relative to the vertical length and a picture displayed on the screen is so distorted as to be elongated horizontally considerably.

SUMMARY OF THE INVENTION

This invention intends to solve the above problems (1) and (2) and has its object to provide a magnetic video recording/reproducing apparatus which can record and reproduce two kinds of video signals for different aspect ratios of the screen and which can ensure normal display of pictures on either of two kinds of television monitors having different aspect ratios, thereby positively attaining compatibility with the existing system and providing an easy-to-handle capability.

Another object of this invention is to materialize a circuit of simplified construction meeting the above principal object.

According to the invention, the first object can be accomplished by a reproduction signal processing circuit comprising means for deciding which one of the aspect ratios al (for example, 16:9 ) and $a_2$ (for example, 4:3 ) a video signal reproduced by the VTR is based on, first output switching means responsive to the results of decision to deliver, when the $a_1$ aspect ratio is determined, the reproduced video signal as it is to a monitor television of $a_1$ aspect ratio but timeexpand the reproduced video signal by $a_1/a_2$ and deliver a time-expanded signal to a television monitor of $a_2$ aspect ratio, second output switching means responsive to the results of decision to deliver, when the $a_2$ aspect ratio is determined, the reproduced video signal as it is to the monitor television of $a_2$ aspect ratio but time-compress the reproduced video signal by $a_2/a_1$ and deliver a time-compressed signal to the television monitor of $a_1$ aspect ratio, and means for generating timing clock signals necessary to effect time compression/expansion operation.

To accomplish the second object, according to the invention, frequencies of the timing clock signals are represented by fractions of simplified form such as for example 24/7 fsc and 32/7 fsc, where fsc is, the chrominance signal sub-carrier frequency and is equal to 4.5/286×455/2 MHZ, when the aspect ratio al is 16:9 and the aspect ratio $a_2$ is 4:3.

In the above construction, the means for deciding an aspect ratio in a reproduced video signal is operable to decide which one of the aspect ratios $a_1$ and $a_2$, where $a_1 > a_2$, the reproduced signal is based on by, for example, detecting an aspect ratio identification signal contained in the reproduced signal or detecting the length of the synchronization signal or of the blanking period and generate control signals for switching the output of the first output switching means and the output of the second output switching means. This permits the apparatus to be automated to advantage. The first output switching means delivers the video signal as it is to the monitor television of $a_1$ aspect ratio and time-expands the video signal by $a_1/a_2$ to deliver a time-expanded signal to the monitor television of $a_2$ aspect ratio when the reproduced signal is for the aspect ratio $a_1$, so that a picture on the $a_2$ aspect ratio monitor television can be prevented from being elongated vertically and normal display of pictures can be ensured to advantage. The second output switching means delivers the video signal as it is to the monitor television of $a_2$ aspect ratio and time-compresses the video signal by $a_2/a_1$ to deliver a time-compressed signal to the monitor television of $a_1$ aspect ratio when the reproduced signal is for the aspect ratio $a_2$, so that a picture on the $a_1$ aspect ratio monitor television can be prevented from being elongated horizontally and normal display of pictures can advantageously be ensured.

The means for generating timing clock signals of the aforementioned frequencies supplies the timing clock signals to the first and second output switching means in order to effect the compression/expansion operation on the time base. Advantageously, by setting the clock signal frequencies to the aforementioned numerical values, simplified circuit construction and stable operation can be ensured to prevent pictures and hardware from being affected adversely.

DESCRIPTION OF THE PREFERRED EMBODIMENTS

The present invention will now be described by way of example with reference to the accompanying drawings.

For avoidance of complexity of explanation, an example where the aspect ratio $a_1$ is 16:9 or 16/9 and the aspect ratio $a_2$ is 4:3 or 4/3 will be described.

Figure 1:
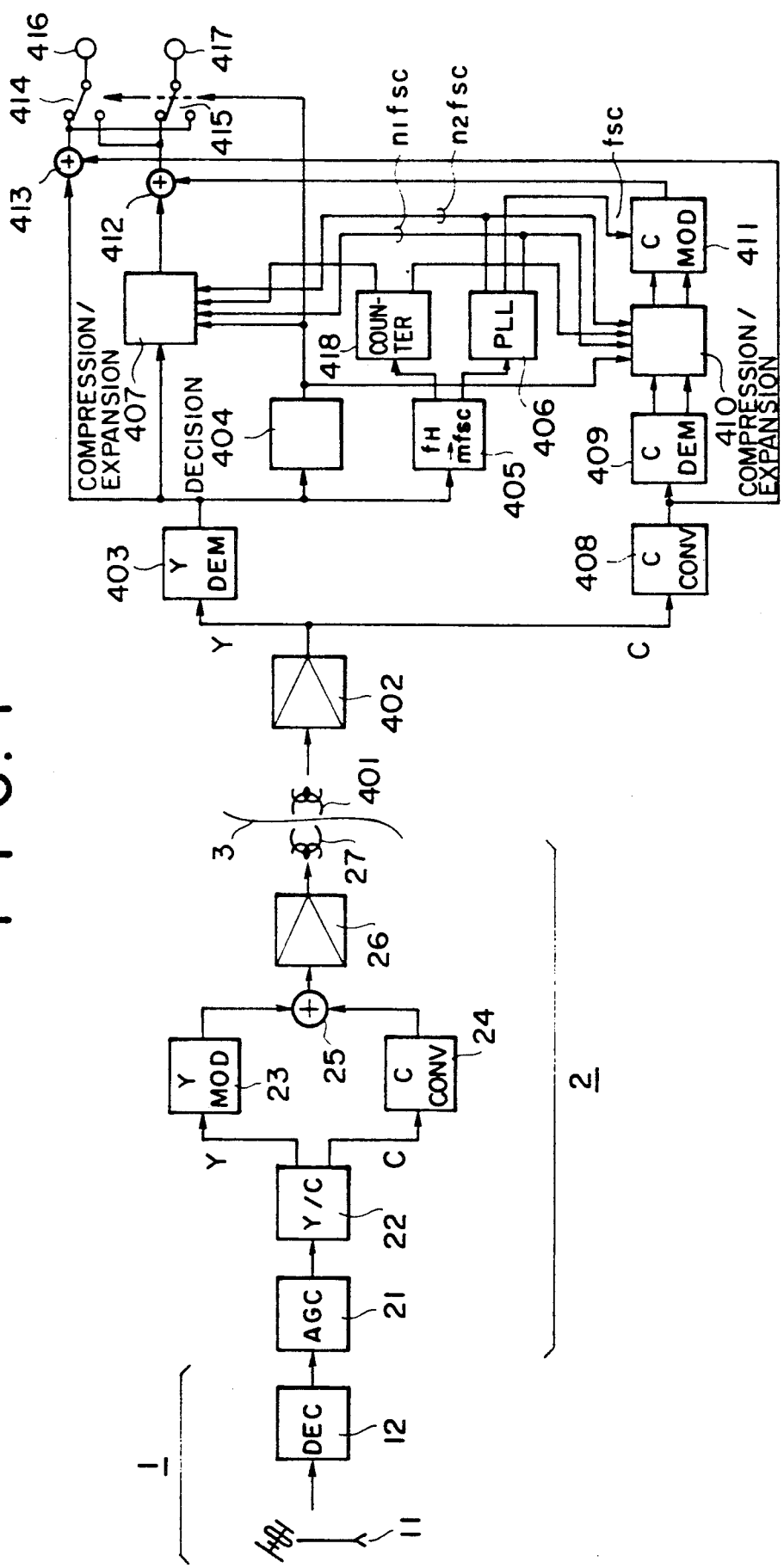
FIG. 1 is a circuit block diagram showing a first embodiment of a magnetic video recording/ reproducing apparatus according to the invention.

FIG. 1 is a circuit block diagram showing the most typical embodiment of the invention, especially, the entirety of a video signal processing system of a VTR.

Figure 2:
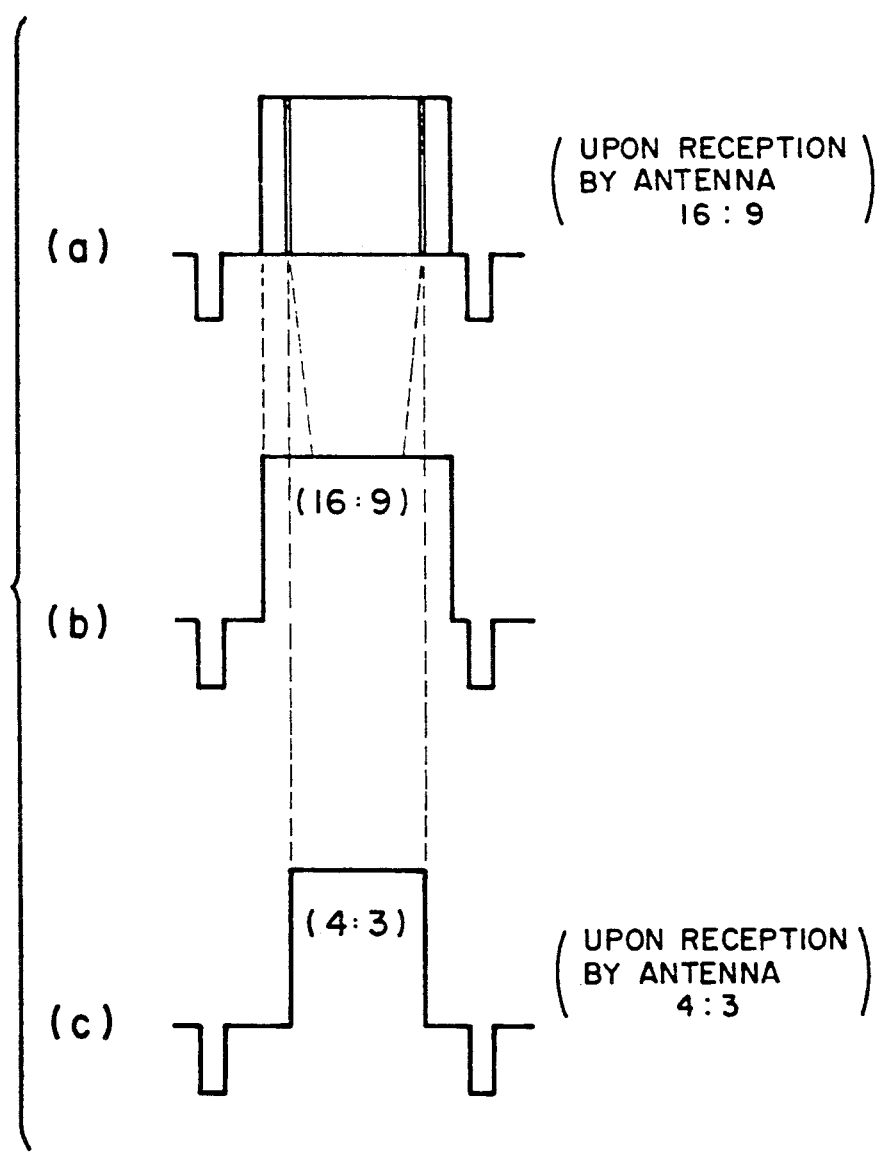
FIGS. 2 to 4 are diagrams showing signal waveforms useful to explain the operation of the FIG. 1 apparatus.
Figure 3:
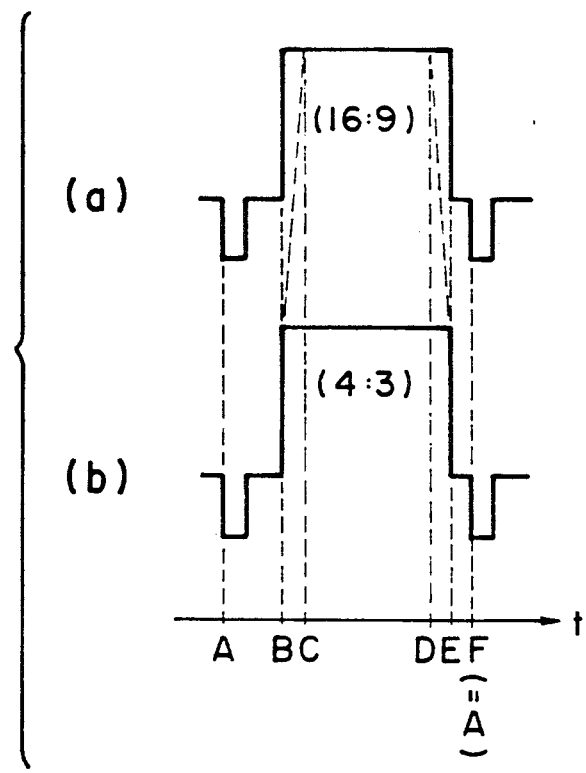
Figure 4:
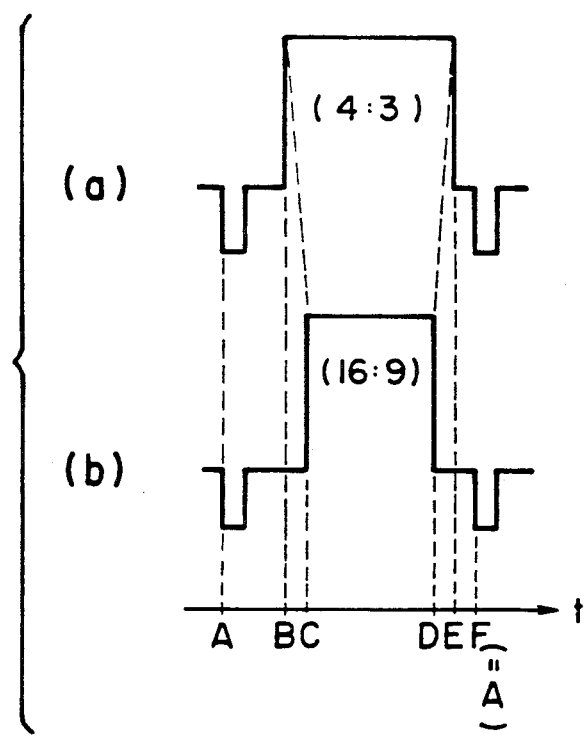

FIGS. 2, 3 and 4 are signal waveform diagrams useful to explain the operation of the FIG. 1 system.

Referring to FIG. 1, a receiver 1 of broadcasting signals includes a television antenna 11 and a wide decoder 12. A signal recording circuit 2 of the VTR includes an AGC (automatic gain control) circuit 21 for normally making constant the level of input signals to be transmitted to the succeeding stage, a Y/C separation circuit 22 for separating a luminance signal (Y) and a chrominance signal (C) from an input signal, a Y signal recording processing circuit 23 which applies pre-emphasis to the Y signal to turn it into a prescribed FM modulated wave, a frequency converter circuit 24 for converting the frequency of the C signal into a frequency lower than that of the luminance FM modulated wave, a circuit 25 operable to mix the Y and C signals during recording, a recording amplifier 26, and a recording head 27. Denoted by 3 is a magnetic tape. A signal reproduction circuit 4 of the VTR includes a reproducing head 401, which may be the same as the recording head 27, a reproducing amplifier 402, a Y signal reproduction processing circuit 403 operable to demodulate a reproduced luminance FM modulated signal and apply de-emphasis to a demodulated signal, an aspect ratio decider circuit 404 for deciding the aspect ratio (4:3 or 16:9) in a reproduced video signal, a first PLL (phase locked loop) circuit 405 for generating a frequency multiplied wave which is phase locked with a reproduced horizontal synchronization frequency fH, a second PLL circuit 406 for generating a signal having a frequency of fsc and compression/ expansion clock signals having frequencies of $n_1$fsc and $n_2$fsc on the basis of the frequency multiplied wave produced from the first PLL circuit 405, a circuit 407 for time-axis compression or expansion of the reproduced Y signal, a frequency converter circuit 408 for converting the frequency of the reproduced C signal into the original band frequency, a, circuit 409 for demodulating the C signal into a base signal band, a circuit 410 for time-axis compression or expansion of the base band signal, a circuit 411 for again modulating the base band signal into a signal of the original band, circuits 412 and 413 operable to mix the Y and C signals during reproduction, switches 414 and 415 transferred to stationary contacts as in the illustration of FIG. 1 when the aspect ratio of the reproduced video signal is 16:9 but inversely transferable when the aspect ratio is 4:3, an output terminal 416 for delivering signals to a monitor television of 16:9 aspect ratio, an output terminal 417 for delivering signals to a monitor television of 4:3 aspect ratio, and a counter circuit 418. The operation of the video signal processing system or a magnetic video recording-/reproducing apparatus constructed as above will now be described.

A video signal extracted from an RF signal received at the television antenna 11 is for either 4:3 or 16:9 aspect ratio. A signal for 4:3 aspect ratio is the same as that used in the existing broadcasting and will not be described particularly herein. A signal for 16:9 aspect ratio has, however, a unique form as mentioned in the previously-described reference. An example of this signal is illustrated at section (a) in FIG. 2 to show its concept. More particularly, in order to maintain the aspect ratio 16:9, the signal for 16:9 aspect ratio has, in addition to a screen center portion covered by the existing 4:3 aspect ratio signal, side portions (side panel portions) of compressed multiplex signals at positions corresponding to horizontal blanking portions of the existing signal. And, the horizontal synchronization frequency for the 16:9 aspect ratio signal is of course the same as that for the existing 4:3 aspect ratio signal. When the 16:9 aspect ratio signal is supplied to the existing monitor television of 4:3 aspect ratio, the screen center portion can be displayed as in the case of the existing 4:3 aspect ratio signal but compressed signals of the side panels are subjected to blanking and can not be displayed. If the 16:9 aspect ratio signal is supplied to a future monitor television of 16:9 aspect ratio, this signal will take the same form as the output signal of a 16:9 camera, thanks to the operation of the internal circuit of this monitor television, as shown at section (b) in FIG. 2, and therefore the entire screen including the side panels can be displayed. However, the screen center portion of the signal shown at (b) in FIG. 2 is more compressed than that of the signal shown at (a) in FIG. 2 and consequently a time-axis segment covered by the signal shown at (b) in FIG. 2 is smaller than that covered by the existing 4:3 signal shown at (c) in FIG. 2. Accordingly, if the signal shown at (b) in FIG. 2 is inadvertently supplied to the 4:3 monitor television, there results a disadvantage that a picture to be displayed is vertically elongated considerably.

A video signal received at the television antenna 11 is sent to the wide decoder 12. If the input signal is of the existing 4:3 signal, this input signal, as it is, is permitted to pass through the wide decoder but if the input signal is of the 16:9 signal shown at (a) in FIG. 2, the wide decoder converts this input signal into the form of a camera output signal shown at (b) in FIG. 2 and the converted signal is sent to the succeeding stage.

The conversion of the 16:9 signal and subsequent application of the converted signal to the VTR is advantageous in the following points. More particularly, in a VTR integral with camera, the camera output is connected directly to the AGC circuit 21 and Y/C separation circuit 22. Therefore, in order to permit the signal form shown at (a) in FIG. 2 to be connected, the camera is required to incorporate a complicated encoder circuit. This simply impairs reduction in cost, size and weight. Therefore, the converted signal shown at (b) in FIG. 2 is supplied to the VTR.

In a stand-alone type VTR, the wide decoder 12 may be considered as part of the recording signal circuit 2 and obviously may be incorporated in the VTR.

The output signal of the wide decoder 12 is supplied to the recording signal circuit 2 of the VTR. Firstly, the AGC circuit 21 turns the received signal, regardless of its magnitude or level, into a video signal of a constant level and this video signal is divided into a Y signal component and a C signal component by means of the Y/C separation circuit 22. The former component is applied with emphasis and thereafter turned into an FM modulated wave having a prescribed frequency (5.4 to 7.0 MHz under the S-VHS standard) by means of the Y signal recording processing circuit 23. The frequency of the latter component is converted into a frequency (0.629 MHz under the S-VHS standard) lower than that of the FM modulated wave by means of the C signal recording processing circuit 24. The output signals of the two circuits 23 and 24 are frequency multiplexed by means of the mixer circuit 25 operable to mix the Y and C signals during recording and they are recorded on the magnetic tape 3 through the recording amplifier 26 and recording head 27.

The reproduction signal processing circuit 4 carries out the processing during reproduction. Firstly, a signal recorded on the magnetic tape 3 is reproduced by means of the reproducing head 401 and the amplitude of a reproduced signal is amplified to a necessary value by the reproducing amplifier 402. Of the reproduced signal, the luminance FM modulated wave of higher frequency is FM demodulated at the Y signal reproduction processing circuit 403, applied with de-emphasis and as necessary is processed to remove noise. The frequency converted chrominance signal of lower frequency on the other hand is processed to remove phase variation due to time-axis variation by means of the frequency converter circuit 408 and subsequently its frequency is converted into the original frequency (about 3.58 MHz). Since the original frequency is determined by the free-running frequency of a built-in crystal oscillator, the interleave relation between horizontal synchronization frequency $f_H$ and chrominance sub-carrier frequency fsc, as maintained in transmission signals of broadcasting stations, is not held.

The aforementioned constituent elements 2, 3, 401 to 403 and 408 may be the same as those of the existing VTR's of the VHS, S-VHS and 8-millimeter types. In other words, in order to meet the 16:9 aspect signal of future broadcasting, the standard for the existing VTR and these constituent elements are not always required to be changed.

However, in the conventional VTR, the Y output signal of the element 403 and the C output signal of the element 408 are permitted to be transmitted, as well known in the art, only in the form of either a Y/C separated signal or a composite signal resulting from addition of the two output signals. In this case, the signal shown at (b) in FIG. 2 is transmitted to the monitor television when the reproduced signal is for 16:9 aspect ratio. If the monitor television is of the existing 4:3 aspect ratio, pictures to be displayed are considerably distorted so as to be expanded vertically. For the 4:3 reproduced signal, a horizontal expansion will occur.

In accordance with the present invention, the above disadvantages can be eliminated by adding the constituent elements 404 to 407 and 409 to 418. The operation to this effect will be described below.

To eliminate the above disadvantages, it is sufficient that with a reproduced signal for 4:3 aspect ratio, the time axis for a picture is compressed by $\frac{3}{4}$ without changing the horizontal synchronization frequency to thereby display a normal picture on a television monitor of 16:9 aspect ratio and that with a reproduced signal for 16:9 aspect ratio, the time axis for a picture is expanded by 4/3 without changing the horizontal synchronization frequency to thereby display a normal picture on a 4:3 aspect ratio television monitor.

An output signal of the Y signal reproduction processing circuit 403 is applied to the aspect ratio, decider circuit 404, which decides whether the reproduced signal is for the aspect ratio 4:3 or 16:9. The decision method can not be settled at present because details of the format of signals for the aspect ratio 16:9 are pending, but various methods may be employed including, for example, detecting an identification signal which is multiplexed during the horizontal or vertical blanking period in the course of recording or detecting the difference in time width of the synchronization signal. The results of decision are sent to the switches 414 and 415 to transfer them in the direction shown in the case of the aspect ratio being 16:9 but in the opposite direction in the case of the aspect ratio being 4:3. Therefore, for the 16:9 aspect ratio, the sum of the output signals of the Y signal reproduction processing circuit 403 and C signal reproduction processing circuit 408 resulting from the addition at the Y/C signal mixer circuit 413 is delivered to the output terminal 416 for 16:9 monitor television through the switch 414. Similarly, for the 4:3 aspect ratio, the sum of these output signals is delivered to the output terminal 417 for 4:3 monitor television through the switch 415.

A reproduced signal for 16:9 aspect ratio is expanded and then delivered to the output terminal 417 for 4:3 monitor television in a manner as will be described below. For convenience of explanation, the processing of the Y signal will first be described.

An output signal of the Y signal reproduction processing circuit 403 is applied to the compression/expansion circuit 407, comprised of, for example, an A/D converter, a line memory and a D/A converter, so as to undergo a requisite, time-axis processing and thereafter be supplied to the adder 412. The operation required of the compression/expansion circuit 407 will be described with reference to FIG. 3. A signal for 16:9 aspect ratio as shown by the solid line at (a) in FIG. 3 is supplied to the circuit 407. In order that this input signal can be displayed normally on the existing 4:3 television monitor, it is sufficient that about $\frac{3}{4}$ of the screen center portion of the input signal is 4/3 time-expanded to remove pictures at the opposite sides, as shown at (b) in FIG. 3. For example, operation for this purpose is such that the input signal is not subjected to compression/expansion between leading edge A of the horizontal synchronization signal and image start point B on the time axis t shown in FIG. 3, is removed between points B and C and between points D and E, is 4/3 time-expanded between points C and D and is not subjected to compression/expansion between points E and F (=A). Clock signals for realization of the above operation can be generated in a manner to be described below.

The output signal of the Y signal reproduction processing circuit 403 is also supplied to the first PLL circuit 405 in which the synchronization signal is separated from the reproduced signal to extract a pulse signal having the frequency $f_H$ of the horizontal synchronization signal. The pulse signal is frequency multiplied at the PLL circuit to produce high frequency pulse signals (high frequency clock signals) inclusive of a jitter component generated in the VTR and which are phased locked with the horizontal synchronization signal frequency. The frequency of the high frequency clock signals may take desired values but conveniently may be selected to 4 fsc (910 $f_H$) and 2 fsc (455 $f_H$) which are related to the chrominance sub-carrier frequency fsc. The following description will be given by referring to an example where 2 fsc is used for a counter clock signal and 4 fsc is used for the original clock signal of the second PLL circuit 406.

The counter clock signal supplied to the counter circuit 418 is once reset at, for example, the leading edge of the horizontal synchronization signal (A in FIG. 3) to provide zero count value and is then used to count the high frequency clock signal. The counter circuit 418 then sends timing pulse signals to the compression/expansion circuit 407 at timings B, C, D, E and F shown in FIG. 3. Assuming that the frequency of the high frequency clock signal is 2 fsc, the timing pulse signals correspond to count values of about 71, 118, 401, 448 and 455 (=0), respectively.

On the other hand, the original clock supplied to the second PLL circuit 406 is subjected thereat to suitable frequency multiplication/division to produce two kinds of clock signals having frequencies $n_1 fsc$ and $n_2 fsc$ where $n_1 > n_2$ stands ($n_1$ and $n_2$ not always being integers). The two clock signals are of course phase locked with the horizontal synchronization frequency $f_H$ and the ratio between frequencies $n_1 fsc$ and $n_2 fsc$ is 4:3. These clock signals are also supplied to the compression/expansion circuit 407. Values of the frequencies $n_1 fsc$ and $n_2 fsc$ are specified in a manner to be described later.

The compression/expansion circuit 407 is operable to perform writing to the line memory in synchronism with a clock signal of $n_2 fsc$ frequency, for example, during an interval of time corresponding to the aforementioned count values 1 to 71 and an interval of time corresponding to count values 449 to 455, stop writing (for example, by supplying no clock signal) during an interval of time corresponding to count values 72 to 118 and an interval of time corresponding to count values 402 to 448 and perform writing in synchronism with a clock signal of $n_1 fsc$ frequency during an interval of time corresponding to count values 119 to 401. By reading to contents thus stored in the line memory in synchronism with the clock signal of $n_2 fsc$ regardless of the aforementioned count values, the intended operation can be realized. This will be described later more specifically with reference to FIG. 16.

The C signal can be processed in a similar way by using the compression/expansion circuit 410. In this case, however, the output signal delivered out of the C signal reproduction processing circuit 408 takes the form of a quadrature two-phase modulation by the sub-carrier having frequency fsc and therefore it is reverted to two color difference signals of base band signals R-Y and B-Y (any other two color difference signals of, for example, quadrature I and Q signals may be used) by means of the demodulation circuit 409 and the color difference signals are supplied to the compression/expansion circuit 410. Processed signals delivered out of the circuit 410 are again subjected to quadrature two-phase modulation at the modulator 411 and a modulated signal is sent to the Y/C mixer circuit 412. If the quadrature two phase modulation by the sub-carrier signal is subjected to compression/ expansion as it is, this sub-carrier frequency will be changed and it becomes impossible to reproduce the chrominance signal on the monitor television. Therefore, the sub-carrier signal is returned once to the base band signal, and after that, the sub-carrier signal is subjected to compression/expansion. As the modulating carrier for modulation to be effected in the modulator 411, the clock signal having frequency fsc delivered out of the second PLL 406 is used. This ensures that the interleave relation between the Y and C signals can be set up in the signal sent to the existing monitor television of 4:3 aspect ratio through the switch 415 and output terminal 417.

With the reproduced signal for 4:3 aspect ratio, this signal is compressed and sent to the output terminal 416 for the monitor television of 16:9 aspect ratio in a manner, described below. As in the preceding description, a description will be given by referring to the processing of the Y signal.

The input signal to the compression/expansion circuit 407 is a signal for 4:3 aspect ratio as shown by solid line at (a) in FIG. 4. In order that this input signal can be displayed normally on the 16:9 television monitor, it is sufficient that the entire image portion of this input signal is ¾ time-compressed and the opposite sides of the screen are subjected to blanking, as shown at (b) in FIG. 4. For example, operation for this purpose is such that the input signal is not subjected to compression/expansion between points A and B on the time axis shown in FIG. 4, the value at point B is held between points B and C (or the interval between trailing edge of the horizontal synchronization signal and point B is extended to point C), a portion ranging from point C to point D of the input signal is ¾ time-compressed between points B and E, the value at point B or E is held between points D and E (or the interval between points E and F is so extended as to be replaced by the interval between points D and F) and the input signal is not subjected to compression/expansion between points E and F (=A).

To implement the above operation procedure, the compression/expansion circuit 407 performs writing to the line memory in synchronism with the clock signal of $n_1 fsc$ frequency, for example, during an interval of time corresponding to count values 1 to 71 of the aforementioned counter circuit 418 and an interval of time corresponding to count values 449 to 455 and in synchronism with the clock signal of $n_2 fsc$ frequency during an interval of time corresponding to count values 72 to 448. By reading the contents thus stored in the line memory in synchronism with the clock signal of $n_1 fsc$ frequency during the interval of time corresponding to count values 1 to 71, the interval of time corresponding to count values 449 to 455 and an interval of time corresponding to count values 119 to 401 and by holding the previous value (for example, supplying no clock signal) during the interval of time corresponding to count values 72 to 118 and the interval of time corresponding to count values 402 to 448, the intended operation can be realized. The processing of the C signal can be done in a similar way and will not be described herein. The Y and C signals are added together at the Y/C mixer circuit 412 and the sum connects to the monitor television of 16:9 wide aspect ratio through the switch 414 and output terminal 416. In this case, the interleave relation is of course set up between the Y and C signals.

As described above, in accordance with the first embodiment of the invention shown in FIG. 1, the connection of the apparatus to the VTR integral with camera can be facilitated to advantage by providing the wide decoder 12 in the recording side. Since the wide NTSC signal can be recorded and reproduced without changing the standard for the existing domestic VTR's including the VHS standard, compatibility with the existing VTR's can advantageously be ensured. Further, even when the reproduced signal is for an aspect ratio which is different from that of the monitor television, the reproduced picture can advantageously be freed from disadvantageous distortion of vertical elongation or lateral elongation. Furthermore, the interleave relation between the Y and C signals can be set up to advantage in the reproduced signal.

Further embodiments without departing from the gist of the first embodiment previously described in connection with FIG. 1 will now be described.

Figure 5:
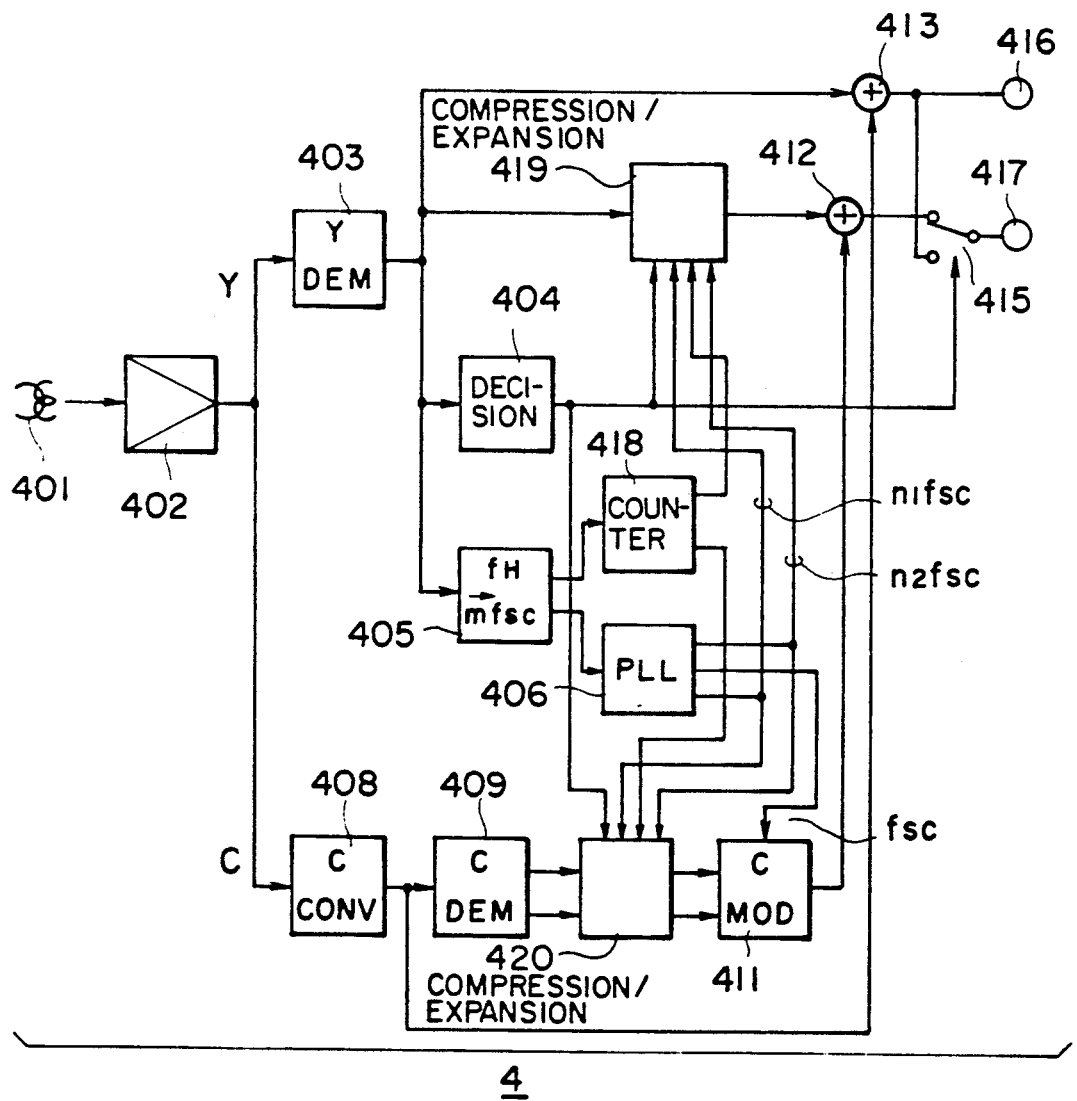
FIGS. 5 to 13 are circuit diagrams showing further embodiments of the magnetic video recording/ reproducing apparatus according to the invention.

Firstly, of the two compression/expansion operations, the operation to convert the reproduced signal for 4:3 aspect ratio into the signal for 16:9 aspect ratio might be unneeded in some applications. The 16:9 monitor television is to be developed in the future and is expected to be able to receive the existing 4:3 signal. Then, conceivably, the function of conversion from 4:3 to 16:9 may be possessed by the monitor television. In this case, it is sufficient that the VTR is provided with only the function of conversion from 16:9 to 4:3. An embodiment of the reproduction signal circuit 4 of VTR to this effect is illustrated in a circuit block diagram of FIG. 5. In FIG. 5, components identical to those of FIG. 1 are designated by the same reference numerals and their operational descriptions will be omitted. Being different from the compression/expansion circuits 407 and 410 of FIG. 1, compression/expansion circuits 419 and 420 are removed of the function of conversion from 4:3 to 16:9. In addition, the switch 414 of FIG. 1 is unneeded and therefore a signal which is independent of the aspect ratio in the reproduced signal and which is always freed from the compression/expansion processing is delivered to the output terminal 416 for the 16:9 monitor television. Obviously, the construction can be simplified to advantage as compared to the FIG. 1 embodiment.

Figure 6:
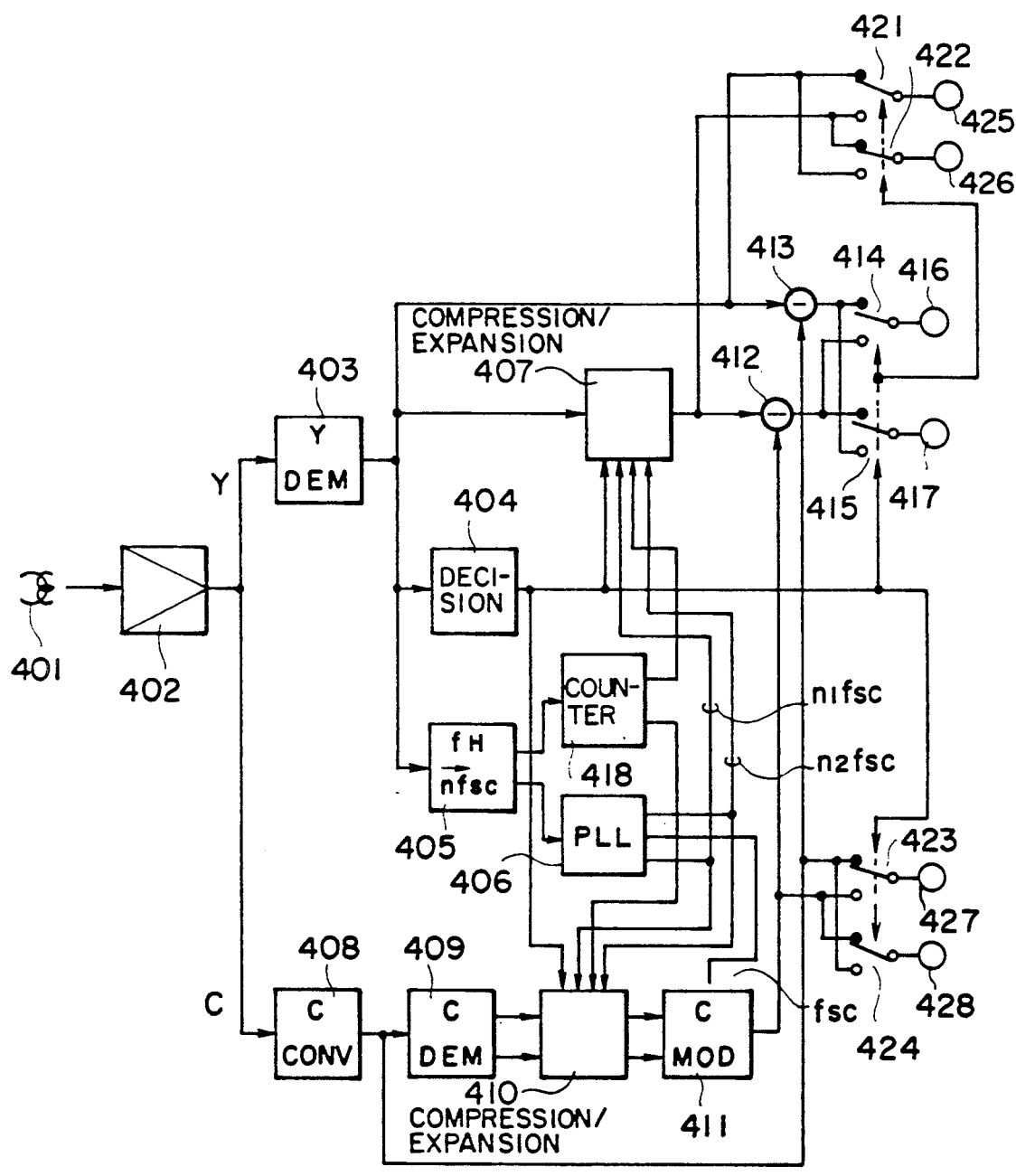

In another embodiment as shown in FIG. 6, in addition to the output terminals 416 and 417 serving to deliver composite signals from the Y/C mixer circuits, output terminals 425 to 428 associated with switches 421 to 424 are provided in order to transmit separated Y and C signals to the succeeding television monitor. In an alternative, with the switches 421 to 424 and output terminals 425 to 428 provided, the Y/C mixer circuits 412 and 413 and switches 414 to 417 may be omitted. As well known in the art, the use of output signals from the Y/C separated signal, output terminals can attain the effect of mitigating disturbances called cross-color and cross-luminance.

Figure 7:
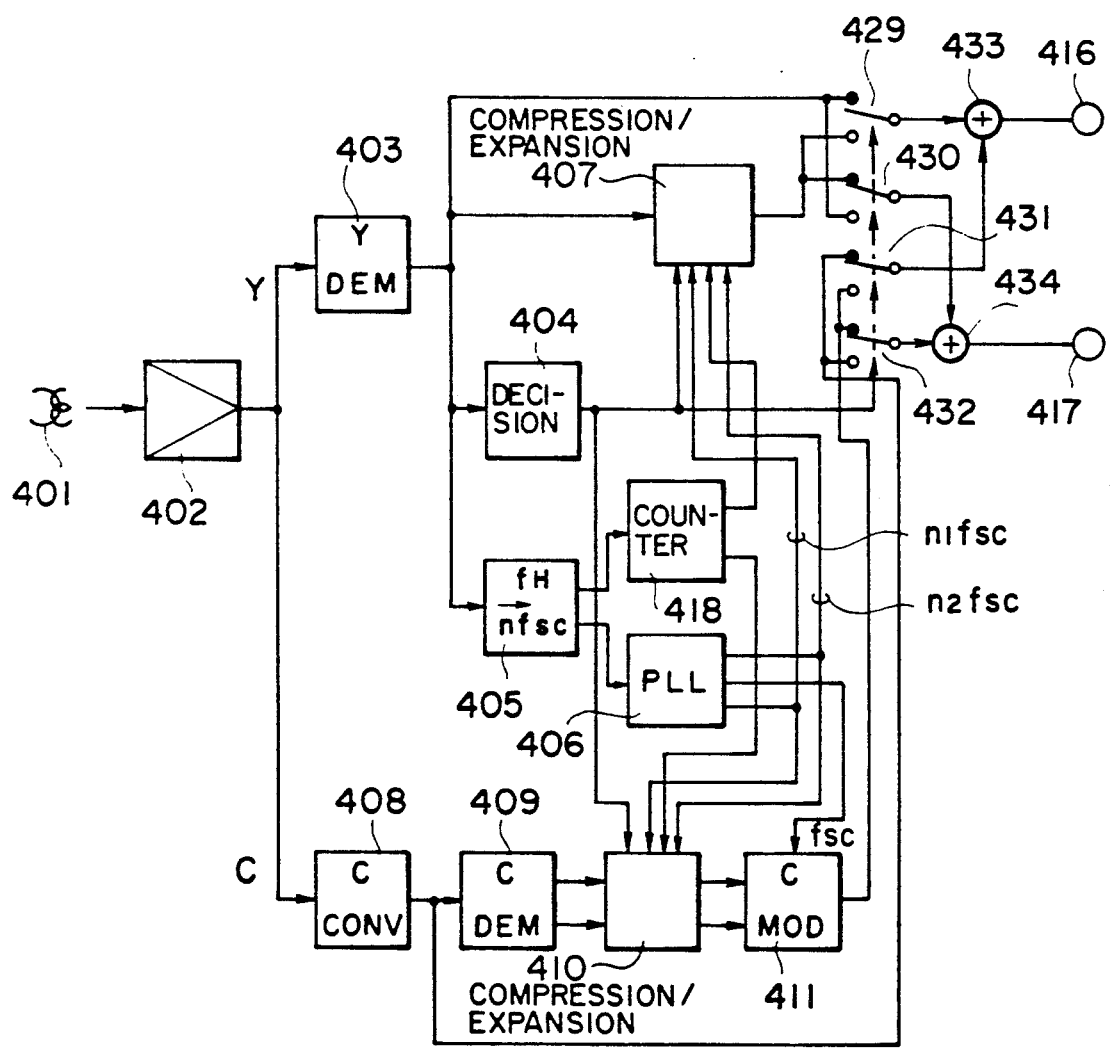

FIG. 7 shows still another embodiment wherein individual components are arranged essentially in the same order as in the FIG. 1 embodiment with the only exception that the order of arrangement is inverted between Y/C mixer circuits 433, 434 corresponding to the Y/C mixer circuits 412, 413 of FIG. 1 and switches 429 to 432 corresponding to or operable similarly to the switches 414, 415 of FIG. 1. Obviously, a similar change in the order of arrangement may be applied to the previous embodiment of FIG. 6.

Figure 8:
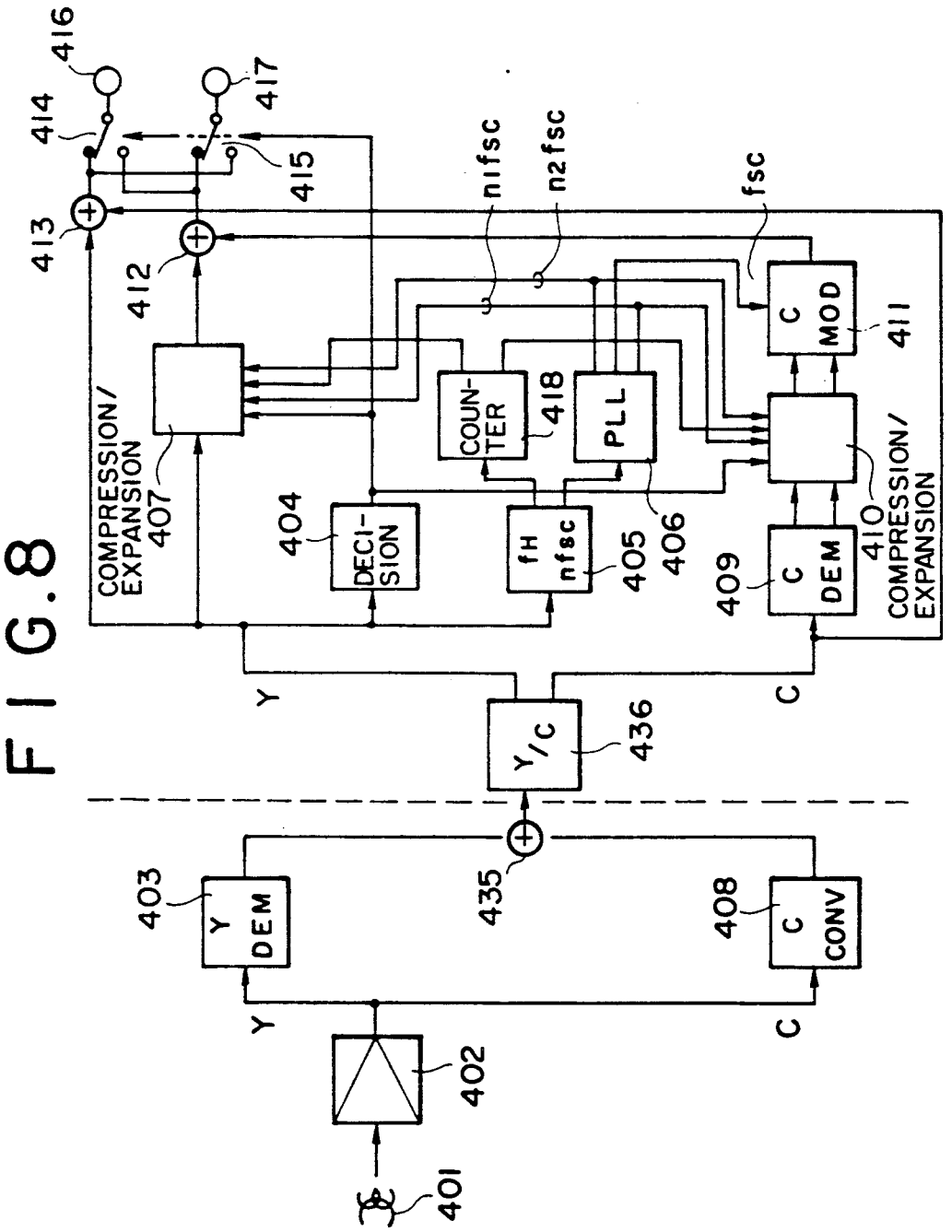

FIG. 8 shows still another embodiment directed to real hardware. In real hardware, the apparatus can be divided into two sections. Particularly, the apparatus often tends to be separated at the boundary standing for the outputs of the Y signal reproduction processing circuit 403 and C signal reproduction processing circuit 408 of FIG. 1. If the separated Y and C signals propagate through the two sections, the apparatus can be divided in such a manner that the FIG. 1 apparatus itself is separated at the boundary. But if the composite signal propagates through the two sections, the apparatus is divided using a Y/C mixer circuit 435 and a Y/C separation circuit 436 as shown in FIG. 8. Since the apparatus is divided at the boundary indicated by dashed line into the two sections, input and output terminals (not shown) are provided at the boundary. If one section on the right side of the dashed line is constructed as independent unit, this unit can be operated to advantage by being connected to the existing VTR's.

Figure 9:
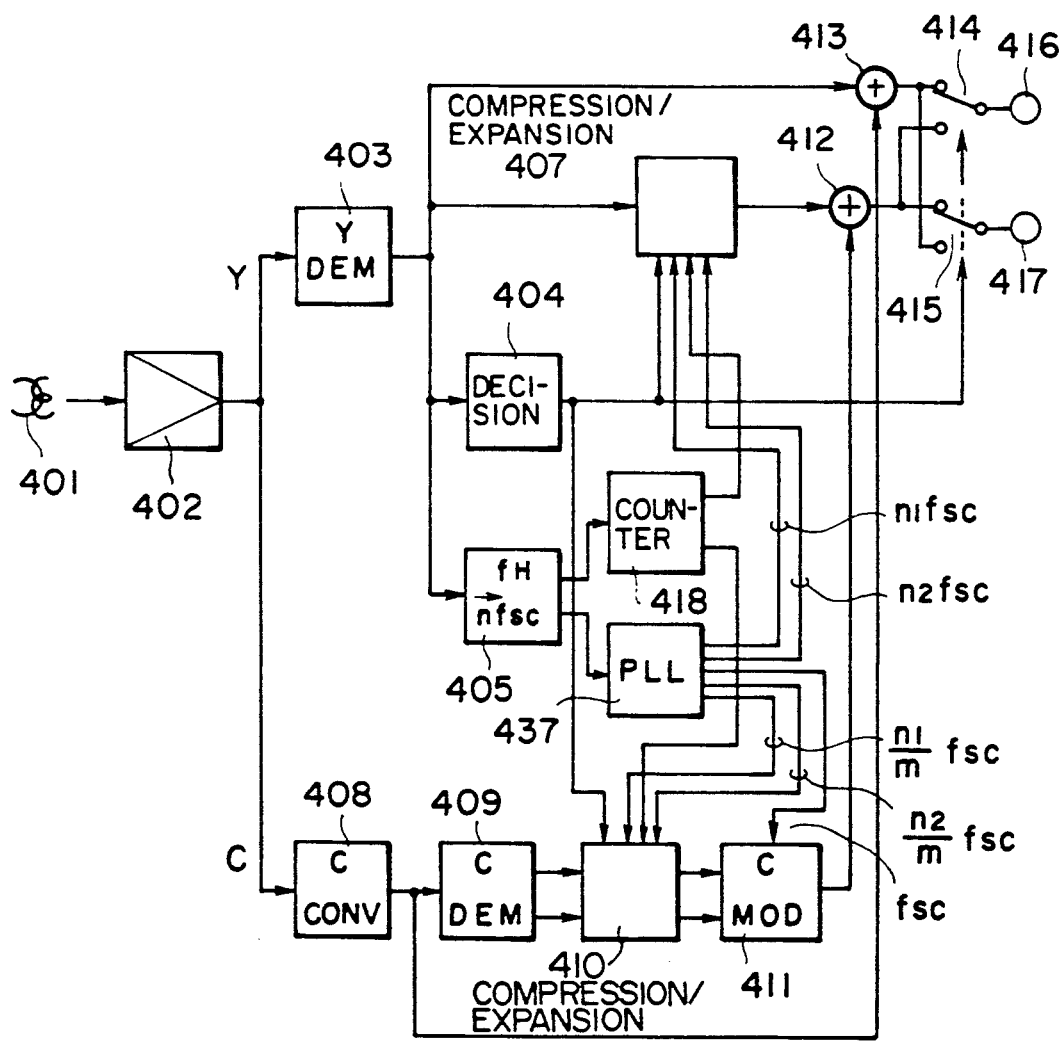

FIG. 9 shows still another embodiment. In the FIG. 1 embodiment, the same clock signals are used for the compression/expansion circuits 407 and 410 but this is not always necessary. The band width of the chrominance signal of base band is about $\frac{1}{4}$ to $\frac{1}{8}$ of that of the luminance signal and therefore the clock frequency for the chrominance signal can be decreased correspondingly. The decrease in the clock frequency raises no problem and besides, attains the effect of decreasing the memory capacity in the compression/ expansion circuit 410. Thus, as shown in FIG. 9, clock signals of frequencies $n_1/m$ fsc and $n_2/m$ fsc, where $m>1$ and m is not limited to an integer, may be produced from a second PLL circuit 437 and supplied to the compression/expansion circuit 410.

Figure 10:
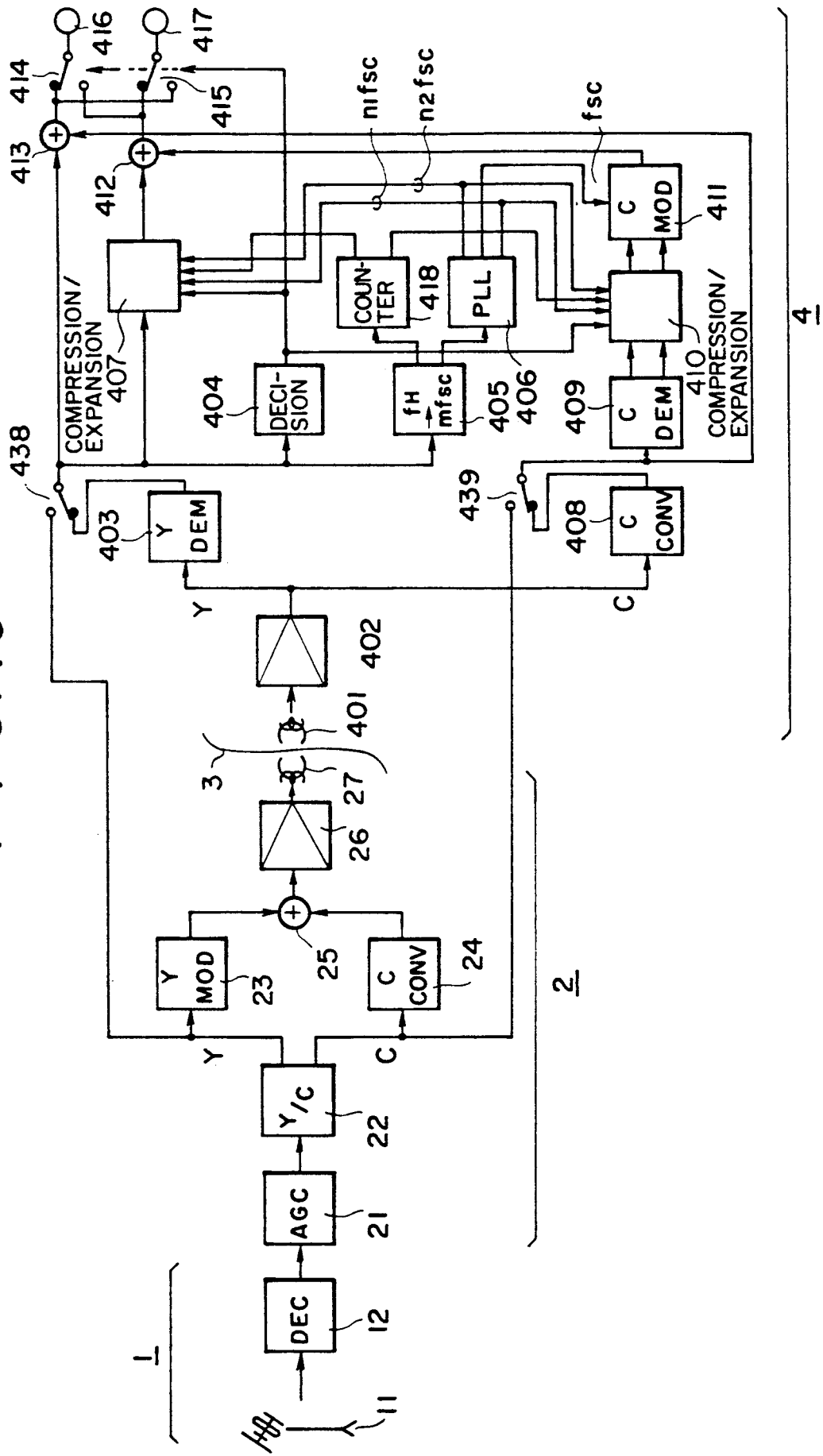

FIG. 10 shows still another embodiment. When video-recording with a VTR, it is necessary to display a video recording signal on the monitor television. The compression/expansion operation set forth so far may of course be applied to the video recording signal (signal during video recording). Thus, in the FIG. 10 embodiment, a switch 438 is provided which switches the Y output signal of the Y/C separation circuit 22 and the output signal of the Y signal reproduction processing circuit 403 in accordance with the operation mode of the VTR and a switch 439 is provided which is similarly operable to switch the C output signal of the Y/C separation circuit 22 and the output signal of the C signal reproduction processing circuit 408 in accordance with the operation mode of the VTR. During reproduction, the switches 438 and 439 are transferred as shown in the illustration of FIG. 10. Advantageously, in accordance with this embodiment, a video recording signal freed from distortion, vertical elongation or lateral elongation, can be monitored.

Figure 11:
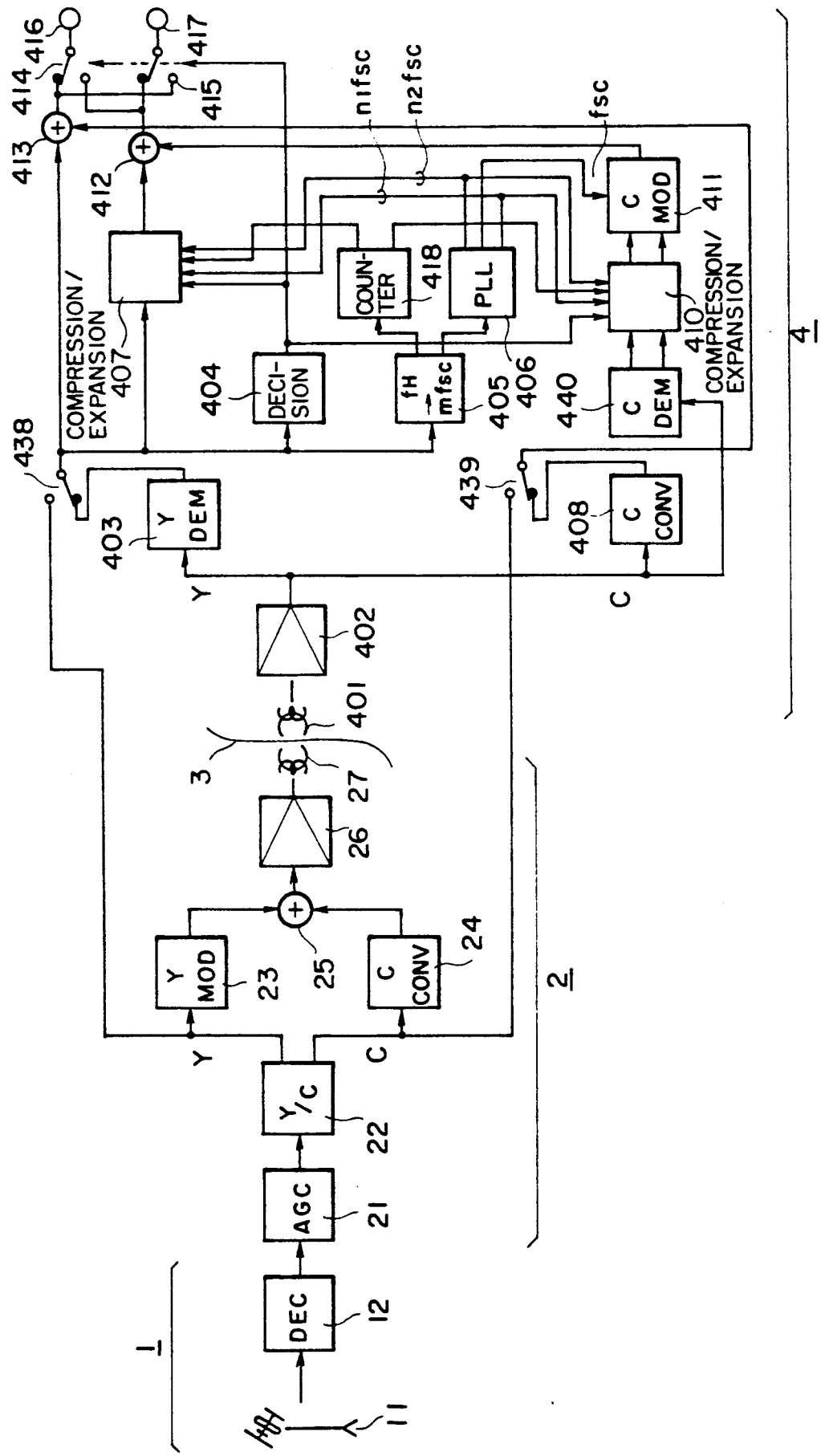

FIG. 11 shows still another embodiment.

The C signal processing in the FIG. 1 embodiment is described by referring to an example where the output signal of the reproduction amplifier 402 is once reverted to the 3.58 MHz band by means of the C signal reproduction processing circuit 408 and thereafter demodulated into the base band signal by means of the demodulator 409. But the C signal may be reverted directly to the base band signal by using the subcarrier of lower frequency (for example, 0.629 MHz as described previously) and then sent to the compression/expansion circuit 410. Such an expedient is applied to the FIG. 10 embodiment to achieve the FIG. 11 embodiment. A demodulator 440 is adapted to revert the reproduced C signal to the base band signal by using the sub-carrier of lower frequency.

Figure 12:
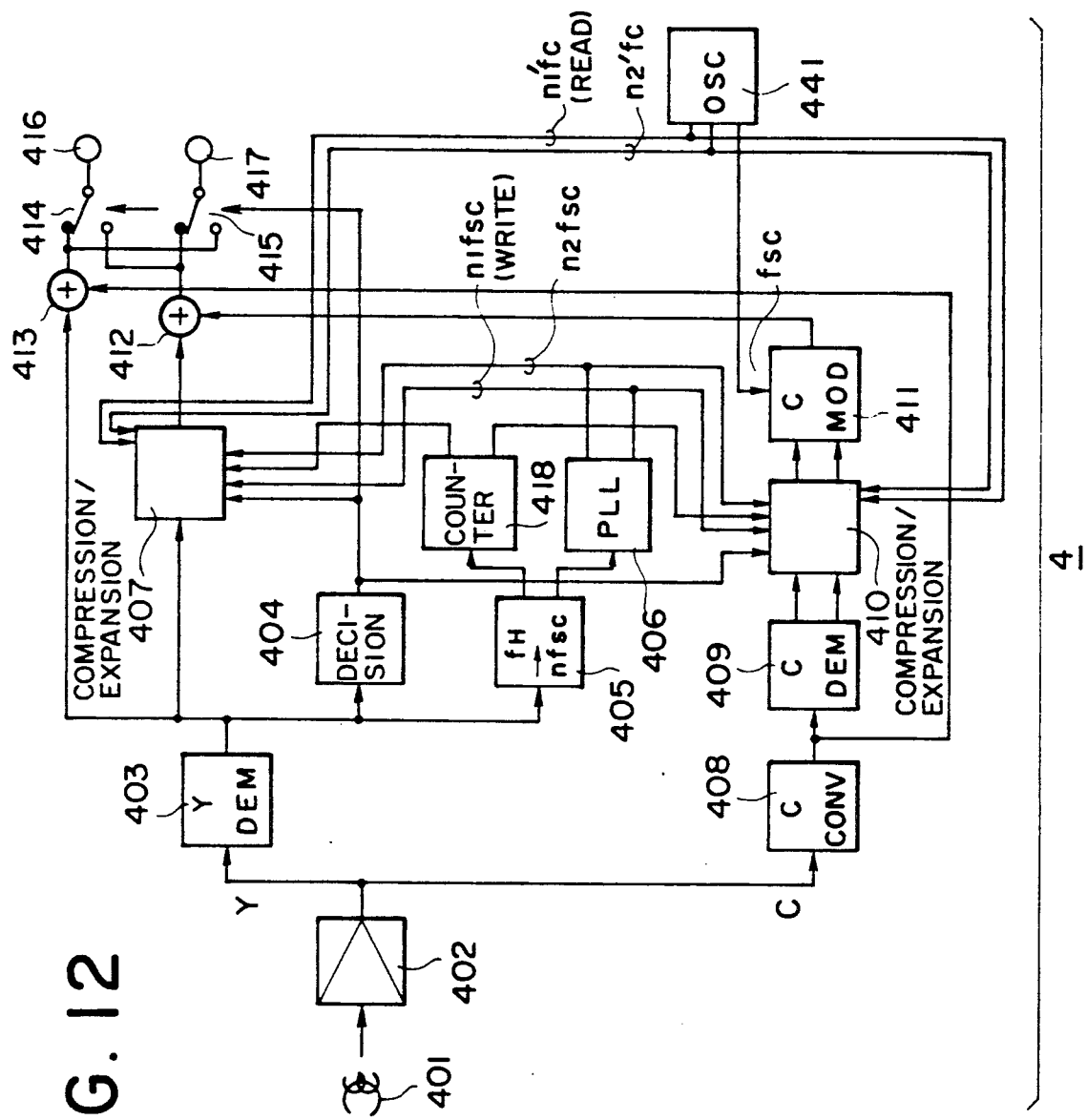

FIG. 12 shows still another embodiment. In the foregoing embodiments, the clock signals produced from the second PLL circuit 406 which are phase locked with the horizontal synchronization frequency $f_H$ are used as the clock signals for the compression/expansion operation, especially, for read/write of the line memory. However, this is not always necessary. Thus, as shown in the FIG. 12 embodiment, the same clock signal as that in the FIG. 1 embodiment may be used for writing the line memory whereas for reading the line memory, clock signals produced from a crystal oscillator 441 and having frequencies $n_1'fsc$ and $n_2'fsc$ may be used. Of course, $n_1':n_2'=4:3$ stands and preferably the relative speed between magnetic tape 3 and reproducing head 401 is controlled such that a mean value of $n_1'fsc$ equals that of $n_1fsc$ and a mean value of $n_2'fsc$ equals that of $n_2fsc$ (constituent elements for this purpose are not shown). Under this condition, the clock signals for writing can be synchronized with variations in the time axis of the recording and reproducing system and the clock signals for reading are of fixed frequencies, so that the TBC (time base corrector) effect of eliminating fluctuations of reproduced image due to jitters in the running system of the VTR can be realized to advantage. In addition, the sub-carrier having frequency fsc and supplied to the modulator 411 of the C signal is also produced from the crystal oscillator 441 and hence the interleave relation between the Y and C signals can be set up advantageously.

Figure 13:
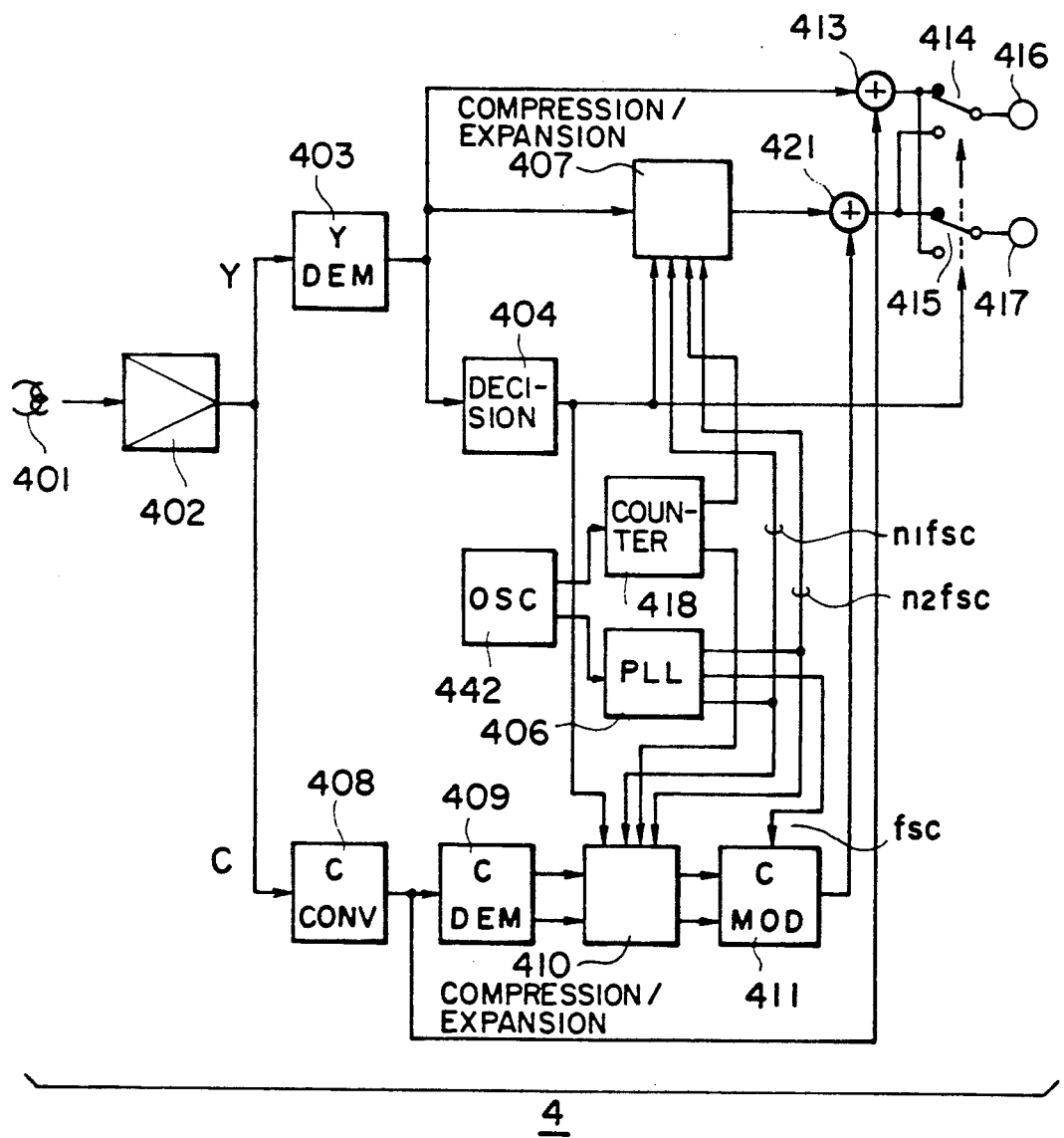

FIG. 13 shows still another embodiment. In the FIG. 1 embodiment, the clock signals for compression/expansion are generated on the basis of the clock signal produced from the first PLL circuit 405 and phase locked with the horizontal synchronization frequency $f_H$ of the reproduced signal. This is because unless the clock signals for memory writing supplied to the compression/expansion circuits 407 and 410 are phase locked with the horizontal synchronization frequency $f_H$ of the reproduced signal, the sampling phase varies with each scanning line to cause fine jitters at image edge portions. However, such a strictness in performance is not always required of simplified VTR's. In addition, the first PLL circuit 405 has in general a high frequency multiplication ratio and its performance is difficult to obtain. Accordingly, the FIG. 13 embodiment is directed to such a simplification and in this embodiment all of the clock signals supplied to the compression/expansion circuits are generated on the basis of a fixed frequency clock signal produced from a crystal oscillator 442. This embodiment can also achieve structural simplification.

Obviously, some of the embodiments shown in FIGS. 5 to 13 may be used in combination.

To describe the individual components shown in FIG. 1 in greater detail, since the receiver 1 including the elements 11 and 12, the signal recording circuit 2 including elements 21 to 27, the magnetic tape 3, and the components 401, 402, 403, 408, 409, 411 and 412 to 417 are known and the operation of the decider circuit 404 has already been described, only the PLL circuits 405 and 406 and the compression/expansion circuits 407 and 410 will be broken down hereinafter.

Figure 14:
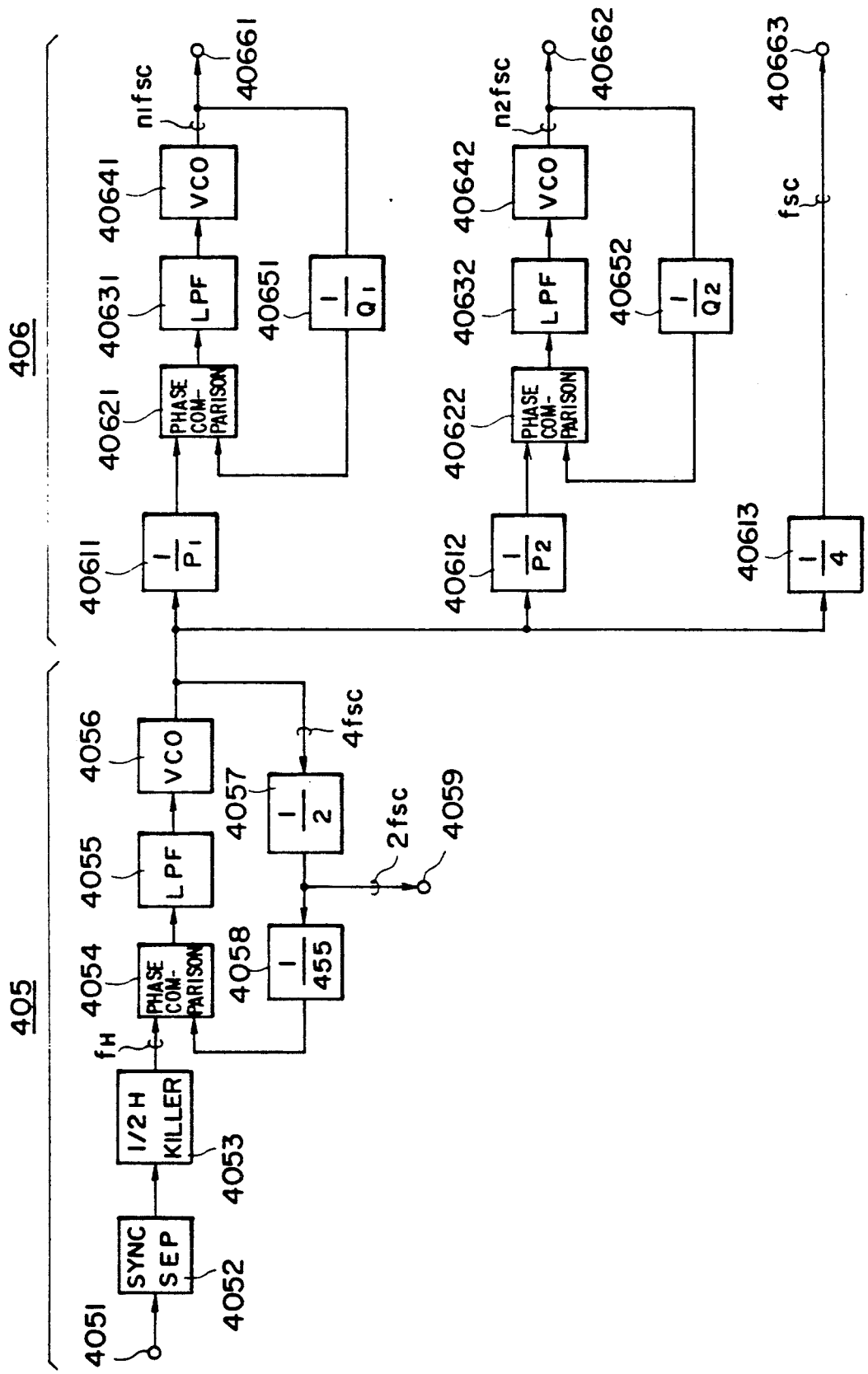
FIGS. 14 and 15 are circuit diagrams showing embodiments of some components of the FIG. 1 apparatus.

FIG. 14 is a circuit block diagram showing an embodiment of the first and second PLL circuits 405 and 406 in FIG. 1. The operation of this embodiment will first be described.

Applied to an input terminal 4051 of the first PLL circuit 405 is a reproduced luminance signal delivered out of the Y signal reproduction processing circuit 403. A synchronization separation circuit 4052 separates from the reproduced luminance signal a composite synchronization signal and a ½ H pulse killer circuit 4053 comprised of a monostable multivibrator eliminates from the composite synchronization signal equalization pulses and a vertical, synchronization signal within a vertical blanking interval to provide a continuous horizontal synchronization pulse signal of frequency $f_H$ which is supplied to one terminal of a phase comparator 4054. A loop of phase comparator 4054, LPF (low-pass filter) 4055, VCO (voltage controlled oscillator) 4056 and frequency divider circuits 4057 and 4058 constitutes a PLL circuit and at the output of the VCO 4056, a pulse signal appears which has a frequency of, for example, 4 fsc and which is phase locked with the horizontal synchronization signal of the reproduced signal. The frequency 4 fsc (910 $f_H$) is by no means limitative in the present invention and it is simply exemplified as a frequency which is easy to handle in view of practical hardware. This pulse signal is turned by the ½ frequency divider circuit 4057 into a pulse signal which has a frequency of 2 fsc (455 $f_H$) and which is phase locked with the horizontal synchronization signal of the reproduced signal. The 2fsc pulse signal is supplied to the counter circuit 418 of FIG. 1 through an output terminal 4059 and also to the 1/455 frequency divider circuit 4058 so as to be turned into a pulse signal of frequency $f_H$ which is applied to the other terminal of the phase comparator 4054. Thus, the phases of the pulse signal delivered out of the ½ H pulse killer circuit 4053 and the pulse signal delivered out of the 1/455 frequency divider circuit 4058 are compared with each other. The value 2fsc of the frequency of the pulse signal for timing count sent to the counter circuit 418 is not limitative but due to the fact that this pulse signal is used for determining timings for initiation and termination of the compression/expansion operation in the compression/expansion circuits 407 and 410 of FIG. 1, it is preferable that the frequency of this pulse signal be an integer multiple of the horizontal synchronization frequency $f_H$. As an example to this effect, the value 2fsc is described herein and obviously, in an alternative, the pulse signal of 4fsc frequency delivered out of the VCO 4056 may be transmitted directly to the counter circuit 418.

In another alternative, the frequency of the output pulse signal from the VCO 4056 may for example be 13.5 MHz (858 $f_H$) which complies with the standard recommended for video digitization under CCIR. In this case, the product of frequency division ratios of the frequency divider circuits 4057 and 4058 is of course 1/858.

The output signal of the VCO 4056 is also supplied to the second PLL circuit 406. A ¼ frequency divider circuit 40613 divides the frequency of this signal, and at an output terminal 40663, a pulse signal appears which has a frequency of fsc and which is phase locked with the horizontal synchronization signal of the reproduced signal. This pulse signal of fsc frequency is sent to the modulator 411 of FIG. 1 in order to generate a reproduced chrominance signal modulated with the sub-carrier and being in an interleave relationship with the reproduced luminance signal.

On the other hand, the output signal of the VCO 4056 is also applied through a $1/P_1$ frequency divider 40611 to a PLL circuit comprised of a phase comparator 40621, an LPF 40631, a VCO 40641 and a $1/Q_1$ frequency divider circuit 40651 and through a $1/P_2$ frequency divider circuit 40612 to a second PLL circuit comprised of a phase comparator 40622, an LPF 40632, a VCO 40642 and a $1/Q_2$ frequency divider 40652, so that a clock pulse signal having a frequency of $n_1$fsc is delivered to an output terminal 40661 and a clock pulse signal having a frequency of $n_2$fsc is delivered to an output terminal 40662. In the above description, $P_1$, $P_2$, $Q_1$ and $Q_2$ are integers but $n_1$ and $n_2$ are not limited to integers. The two clock pulse signals are sent to the compression/expansion circuits 407 and 410 of FIG. 1 so as to be used for compression/expansion operation.

Values of the frequencies $n_1$fsc and $n_2$fsc are selected in a manner described below. The two clock frequencies must satisfy the following conditions. Firstly, the ratio ($n_1$:$n_2$) between the two frequencies is 4:3. This requirement is due to the fact that the compression/expansion ratio used in the compression/ expansion circuits 407 and 410 is ¾ or 4/3. Secondly, $n_1$ and $n_2$ are preferably fractions of simplified form. With this requirement satisfied, the frequency divider circuits 40611, 40612, 40651 and 40652 can be realized with simplified hardware wherein values of $P_1$, $P_2$, $Q_1$ and $Q_2$ can be selected to be small and the frequencies of the input signals to the phase comparators 40621 and 40622 can be high, thereby improving accuracy of control. Thirdly, $n_1$fsc and $n_2$fsc are preferably integer multiples of $f_H$. This requirement is due to the fact that the video signal is sampled by these clock signals and hence the sampling phase can be the same for each horizontal line. In the fourth place, $$\frac{2}{5} n_1 fsc \text{ and } \frac{2}{5} n_2 fsc$$

are preferably about 5 MHz or more. This is because through sampling, the transmission band generally becomes about 2/5 (in principle, ½) of the clock frequency and a bandwidth of about 5 MHz possessed by up-to-date VTR's under the S-VHS standard is desirably not to be narrowed. In the fifth place, preferably, $n_1$fsc and $n_2$fsc do not excessively go beyond 4 (about 14.3 MHz) and measure a value which is, for example, less than 5 fsc. To explain, since the video signal is sampled at 4 fsc to 13.5 MHz in many applications and operation speeds of the memory, A/D converter and the like are frequently designed under this criterion, the number of utilizable devices is limited if frequencies extremely higher than the sampling frequency are used, and otherwise the construction becomes complicated. In the sixth place, preferably, the number of sampling points per horizontal period is less than 1024. For example, with the clock frequency of 4 fsc used, the number of sampling points amounts to 910 and therefore a widespread one-line memory having 1024 words representative of a power of 2 which exceeds and approximates the 910 sampling-point number can be used as it is.

Numerical values meeting the above conditions will now be examined. From the first condition or requirement, the $n_1$fsc and $n_2$fsc are expressed as follows:

$$n_1 fsc = 4 \times fsc = \frac{2 \times 2 \times x \times 5 \times 7 \times 13}{2} f_H \quad (1)$$

$$n_2 fsc = 3 \times fsc = \frac{3 \times x \times 5 \times 7 \times 13}{2} f_H \quad (2)$$

For X=2, there results $n_1$fsc=8 fsc which goes beyond 4 fsc excessively, violating the fifth condition. For x=1, $n_2$fsc=3 fsc=

$$\frac{1365}{2} f_H$$

and $_5{}^2 n_2 fsc \simeq 4.1$MHz result, violating the third and fourth conditions.

Accordingly, the $n_1$fsc and $n_2$fsc are required to be integer multiples of the $f_H$ within the range of 1<X<2. Equations (1) and (2) prescribe that "X" be a fraction having a numerator of even number and a denominator representative of any one of 5, 7 and 13. Such a fraction "X" can be enumerated by $$\frac{6}{5}, \frac{8}{5}, \frac{8}{7}, \frac{10}{7}, \frac{12}{7}, \frac{14}{13},$$

$$\frac{16}{13}, \ldots \text{ and } \frac{24}{13}.$$

From these numerical values, $$\frac{6}{5}, \frac{8}{7},$$

and $$\frac{16}{13}$$

are selected which satisfy the fourth and fifth conditions, providing $$n_1 fsc = \frac{24}{5} fsc \text{ and } n_2 fsc = \frac{18}{5} fsc,$$

$$n_1 fsc = \frac{32}{7} fsc \text{ and } n_2 fsc = \frac{24}{7} fsc \text{ and } n_1 fsc = \frac{64}{13} fsc$$

and $$n_2 fsc = \frac{48}{13} fsc,$$

respectively. These values satisfy the first, third, fourth and fifth conditions of the above six conditions. The second condition is rather unsatisfied with X=16/13 but $n_1$ and $n_2$ for X=16/13 can be realized readily by using a frequency divider circuit based on 4-bit counter and can be accepted from the practical point of view. In addition, the thus selected values satisfy the sixth condition as will be described later. It should also be understood that in order to obtain clock pulse signals of intended frequencies, $P_1$=5, $P_2$=10, $Q_1$=6 and $Q_2$=9 are selected for X=6/5, $P_1$=$P_2$=7 (to achieve this equality, the frequency divider circuit 40612 may be omitted and the phase comparators 40622 may be connected to receive the same input signal as the phase comparator 40621) and $Q_1=8$ and $Q_2=6$ are selected for $X=8/7$, and $P_1=P_2=13$ (attained in the manner just mentioned above) and $Q_1=16$ and $Q_2=12$ are selected for $X=16/13$. In this manner, the clock pulse signals satisfying the first to sixth conditions can be obtained to advantage.

Figure 15:
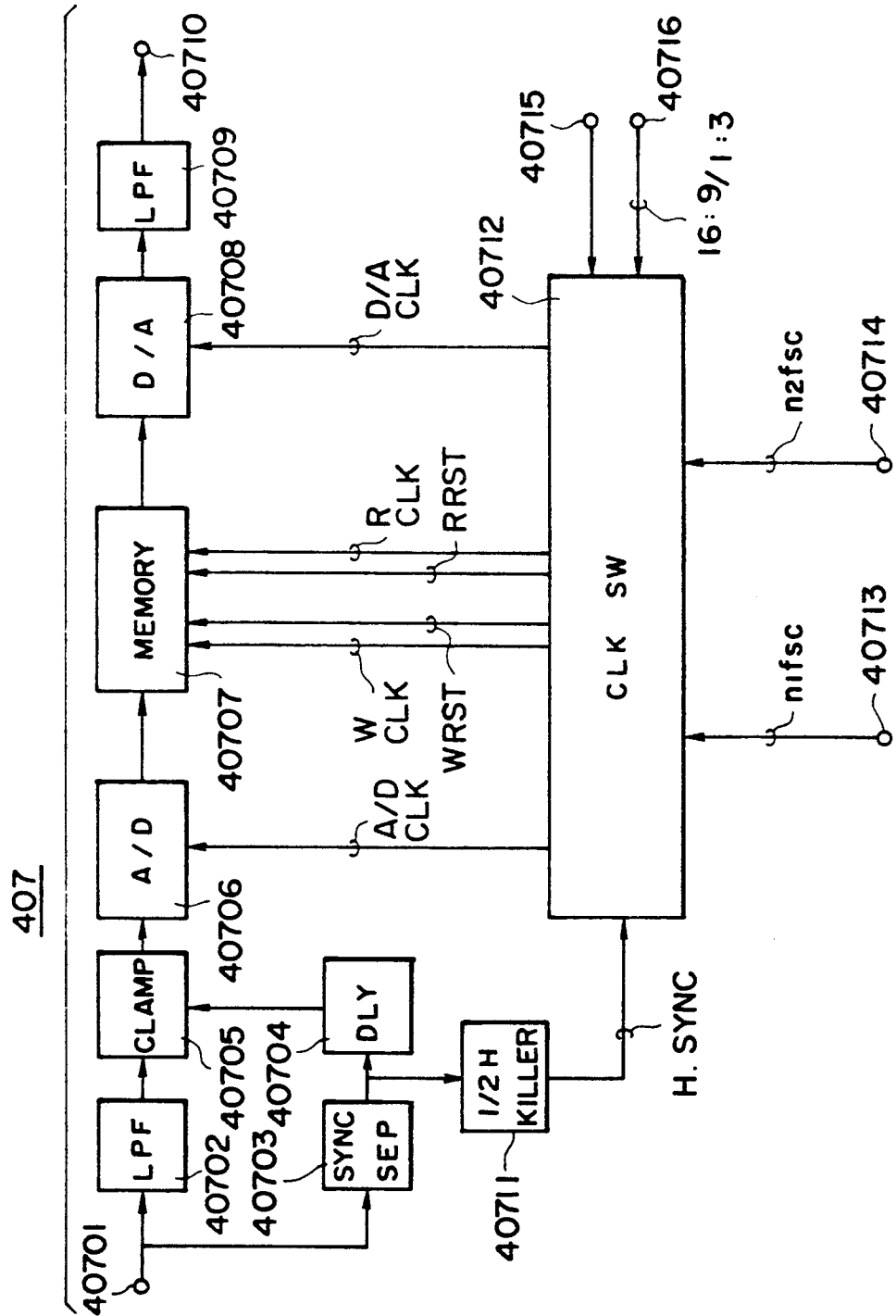

Embodiments of the compression/expansion circuits 407 and 410 of FIG. 1 will now be described. FIG. 15 is a circuit diagram showing an embodiment of the compression/expansion circuit 407 for the luminance signal. The compression/expansion circuit features that its operation inconstantly changes to ensure that the compression/expansion operation is performed only during specified intervals of the video signal, switching is effected between compression and expansion in accordance with the aspect ratio in the reproduced signal and the compression and expansion of the reproduced signal is not effected during the blanking period inclusive of the synchronization signal.

A reproduced luminance signal delivered out of the Y signal reproduction processing circuit 403 of FIG. 1 is received at an input terminal 40701. The received signal is processed to remove noise outside the signal band by means of a low-pass type pre-filter 40702. On the other hand, a synchronization separation circuit 40703 separates from the received signal a composite synchronization pulse signal which in turn is delayed by a delay circuit 40704 until the back porch of the synchronization signal appears. At that pulse timing, a clamp circuit 40705 fixes the pedestal level of the reproduced luminance signal to a constant DC potential and the reproduced luminance signal at the constant DC potential is supplied to an A/D converter 40706. In an alternative, with the delay circuit 40704 omitted, the leading edge of the synchronization signal may be clamped. In pedestal clamping, it is necessary that the leading edge of the synchronization signal should not be clamped but this processing is not essential in the present invention and will not be described herein. In the A/D converter 40706, the input signal is sample held at the timing of a clock signal (A/D CLK in the drawing) produced from a clock switch 40712 so as to be digitized and the resulting digital signal is sent to a memory 40707. This memory may be constructed of, for example, a FIFO (first in first out, in which write and read can proceed simultaneously) having a capacity of 2 lines. In this case, in the memory 40707, the input signal is stored at the timing of a write clock signal (W CLK in the drawing) while the write address is reset by a write reset pulse (W RST in the drawing) occurring every two horizontal periods and the signal is read at the timing of a read clock signal (R CLK in the drawing) while the read address is reset by a read reset pulse (R RST in the drawing) which is 180° out of phase in relation to the write reset pulse W RST. The operation of compression/expansion is effected in accordance with the relation between frequencies of the W CLK and R CLK. When the memory of two-line capacity is used as exemplified herein, the phase of the W RST is made to be 180° different from that of the R RST in order to prevent the read timing from preceding the write timing during compression operation. Also, the use of the FIFO type memory 40707 can eliminate switches which would otherwise be provided forwardly and backwardly of the memory. Accordingly, the memory 40707 may be modified in some ways. The output signal of the memory 40707 is applied to a D/A converter 40708 and reverted thereat to an analog signal at the timing of a clock signal (D/A CLK) produced from the clock switch 40712. The analog signal is processed to remove clock and aliasing components by means of a low-pass type post-filter 40709 and delivered to an output terminal 40710.

The clock switch 40712 is supplied with the clock pulse signal of $n_1$fsc frequency through an input terminal 40713, the clock pulse signal of $n_2$fsc frequency through an input terminal 40714, the timing pulse produced from the counter circuit 418 of FIG. 1, through an input terminal 40715, the signal indicative of the results of decision as to the aspect ratio in the reproduced signal produced from the aspect ratio decider circuit 404 of FIG. 1 through an input terminal 40716 and a horizontal synchronization pulse (H. Sync in the drawing) extracted from the output composite synchronization pulse of the synchronization separation circuit 40703 by means of a ½ H pulse killer circuit 40711, and it sends the aforementioned clock signals and reset pulse signals to the A/D converter 40706, memory 40707 and D/A converter 40708 so as to control the compression/expansion operation.

The operation of the FIG. 15 circuit will be described with reference to FIGS. 16 and 17. Waveforms shown in FIG. 16 are useful to explain the operation when the aspect ratio decision result signal supplied through the input terminal 40716 indicates 16:9.

Figure 16:
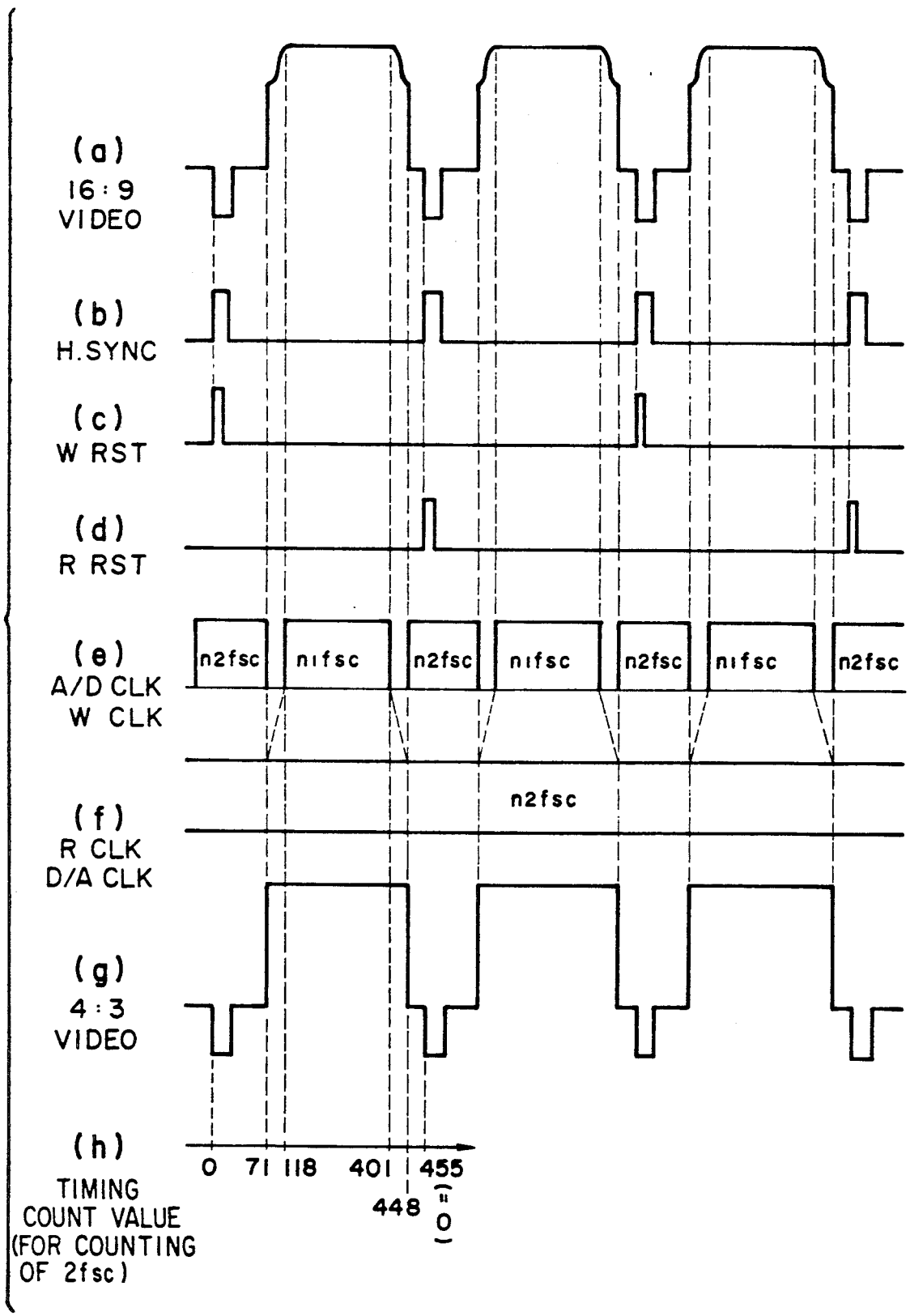
FIGS. 16 and 17 are diagrams showing signal waveforms useful to explain the operation of the FIG. 15 circuit.

When the counter circuit 418 of FIG. 1 performs timing count by counting the 2 fsc clock signal phase locked with the reproduced synchronization signal while resetting its count in synchronism with the reproduced synchronization signal, the timing pulse (count value) received from the input terminal 40715 is related to the signal waveform as shown at (h) in FIG. 16. During intervals of time corresponding to count values 0 to 71 and 449 to 455 ($=0$), there occur the horizontal synchronization signal and front and back porch portions and therefore all the clock signals are rendered to have $n_2$fsc and no compression/expansion is effected as shown at (e) and (f) in FIG. 16. During intervals of time corresponding to count values 72 to 118 and 402 to 448, there occur the screen opposite side panel portions of the video signal for 16:9 aspect ratio and therefore the supply of the clock signal (A/D CLK) to the A/D converter and the memory write clock signal (W CLK) is stopped (stoppage of the supply of only the latter clock signal may also suffice) and these portions of the video signal are eliminated. During an interval of time corresponding to count values 119 to 401, there occurs the screen center portion which undergoes 4/3 time-expansion and therefore the clock signals A/D CLK and W CLK are rendered to have $n_1$fsc and the clock signals R CLK and D/A CLK are rendered to have $n_2$fsc ($=\frac{4}{3} n_1$fsc). Under this condition, the signal for 16:9 aspect ratio as shown at (a) in FIG. 16 is removed of its opposite side portions and time-expanded at its center portion so as to be converted into a signal for 4:3 aspect ratio as shown at (g) in FIG. 16, thus attaining the intended purpose. As the pulse signals W RST and R RST for resetting the address on the memory, pulse signals as shown at (c) and (d) in FIG. 16 which are 180° out of phase from each other can be generated every two horizontal periods on the basis of the horizontal synchronization pulse as shown at (b) in FIG. 16.

In an alternative, during vertical blanking period in which no compression/expansion operation is required, all of the clock signals may be rendered to have $n_2$fsc.

Further, as the clock signals R CLK and D/A CLK, the fixed clock signals produced from the crystal oscillator may be used as in the case of the FIG. 12 embodiment and in this case the reproduced signal may be applied with time base correction.

Figure 17:
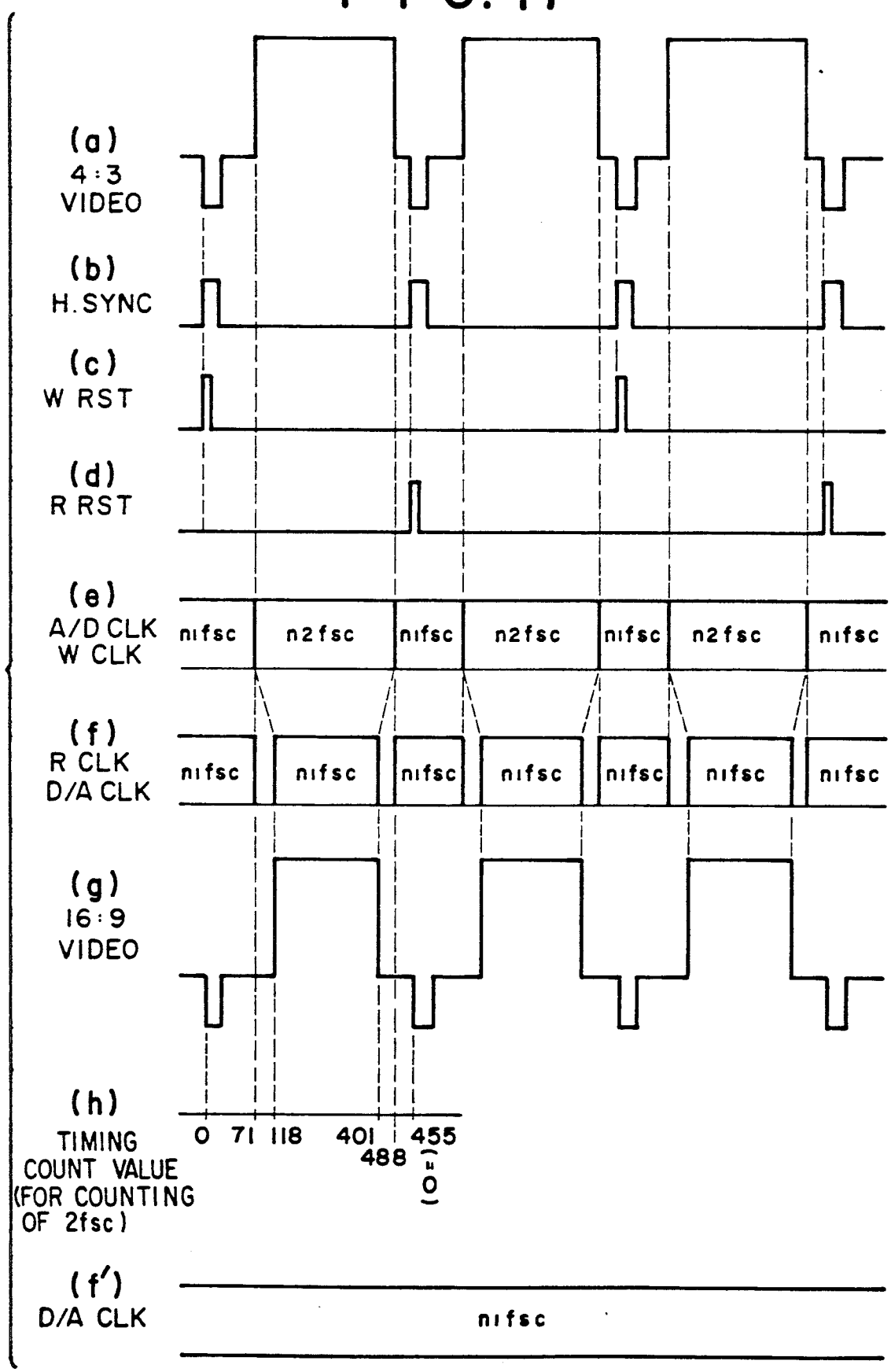

Waveforms shown in FIG. 17 are useful to explain the operation when the aspect ratio decision result signal supplied through the input terminal 40716 of FIG. 15 indicates 4:3.

In intervals of time shown at (h) in FIG. 17, during intervals of time corresponding to timing count values 1 to 71 and 449 to 455 (=0), no compression/expansion is effected, during an interval of time corresponding to count values 72 to 448, the input video signal shown at (a) in FIG. 17 is $\frac{3}{4}$ time-compressed so as to be turned into a time-compressed signal which is delivered during an interval of time corresponding to count values 119 to 401, and during intervals of time corresponding to count values 72 to 118 and 402 to 448, blanking is effected. Therefore, clock signals as shown at (e) and (f) in FIG. 17 may be used. Of these clock signals, however, only the D/A CLK may be, in an alternative, a continuous wave of $n_1 fsc$ frequency as shown at (f') in FIG. 17.

If the monitor television has the compression function, the functions represented by waveforms shown in FIG. 17 may be eliminated from the VTR.

If values of the clock frequencies are selected from numerical values exemplified previously so that $$n_1 fsc = \frac{32}{7} fsc \text{ and } n_2 fsc = \frac{24}{7} fsc$$

stand, the number of sampling points per horizontal period is 780 in the case of FIG. 16 and 825 in the case of FIG. 17, indicating that the aforementioned sixth condition for the clock frequency (within 1024 words) is satisfied.

The compression/expansion circuit 410 for the reproduced C signal may be constructed in a similar manner. However, this circuit 410 handles two color difference signals of base band and therefore it must be constructed using two channels of the FIG. 15 circuit. To cope with this problem, it is conceivable that the clock frequency for the C signal is made to be lower than that for the Y signal and the two color difference signals are subjected to, for example, dot sequential processing, thereby permitting realization of the compression/expansion circuit 410 with one channel of the FIG. 15 circuit.

Specified numerical values of the timing count are demonstrated at (h) in FIG. 16 and at (h) in FIG. 17 but they may be changed slightly to fairly meet practical purposes. It should therefore be appreciated that the specific numerical values are of approximate values and even if changed slightly, they may be within the framework of the invention.

As the future wide aspect ratio $a_1$, 16:9 is used throughout the specification for only illustration purposes and different values of the wide aspect ratio, for example, 5:3 and 14:9, may be handled by similar methods.

While in the foregoing the apparatus has been described on the presumption that it has the video recording/reproducing function, the invention may also be applied to apparatus having only the reproduction function in quite the same way.

The present invention may be practiced in other forms than the foregoing embodiments without departing from the spirit and principal features. Accordingly, the foregoing embodiments have been described at all points for illustration purposes only and should not be construed limitatively. The scope of the invention is defined in the appended claims. Various changes and variations, within the scope of the claims, may fall within, the scope of the invention.

Until now, we have disclosed embodiments in which the aspect ratio converting operation is carried out by the video signal being subject to horizontal time-axis compression/expansion. However, there are other methods which have the same purpose.

In one example of such a method, the signal for an aspect ratio 16:9 is converted into the signal for an aspect ratio of 4:3 by thinning out scanning lines, the upper and lower sides of the screen are subjected to blanking on the monitor television having a 4:3 aspect ratio, and the entire horizontal picture including both of the extreme opposite sides is displayed. This method can be applied to the present invention.

In the above mentioned embodiments, the path which outputs the signal without the aspect ratio converting operation does not output the signal through the compression/expansion circuit; however, it is possible to output the signal through the compression/expansion circuit. During this time, the memory writing and reading respective frequencies are adjusted to be the same frequency. Even if the aspect ratio converting operation is not carried out, the time-axis can be corrected to advantage. In this case, output terminals are turned into one terminal, and then, both outputs for the monitor televisions having aspect ratio 16:9 or 4:3 can be obtained from the one output. One of the outputs is selected by utilizing the operator's manual, or sending back a signal from the monitor television to the VTR, which indicates the aspect ratio of the monitor television to the VTR. Further, in this case, if the compression/expansion circuits are individually installed for two aspect ratios with respect to Y and C signals, each output signal for monitor televisions having aspect ratios of 16:9 or 4:3 can be delivered separately.

It is noted that the above mentioned "converts the signal for an aspect of 16:9 (or 4:3) into the signal for 4:3 (or 16:9)" means that the signal which displays the normal picture on the monitor television having an aspect ratio of 16:9 (or 4:3) is displayed as a normal picture on the monitor television having an aspect ratio of 4:3 (or 16:9), in other words, it is realized that the both kinds of signals can be displayed without the picture being elongated vertically or horizontally.

What is claimed is:

1. A magnetic video recording/reproducing apparatus having a recording circuit for recording two kinds of video signals based on different aspect ratios $a_1$ and $a_2$, where $a_1 > a_2$, and a reproduction circuit for reproducing recorded video signals, said apparatus comprising:

a Y/C separation circuit including a filter which receives a composite video signal to be recorded, separates from the composite video signal a luminance signal and a chrominance signal and outputs the luminance and chrominance signals;

a luminance signal recording processing circuit including a pre-emphasis circuit which receives the luminance signal from said Y/C separation circuit and applies pre-emphasis to at least the luminance signal and an FM modulator circuit which FM modulates the luminance signal to which pre-emphasis has been applied into an FM modulated luminance signal;

a chrominance signal recording processing circuit including a frequency converter circuit which receives the chrominance signal form said Y/C separation circuit and down converts said chrominance signal from an original frequency band of said chrominance signal to a lower frequency band within a frequency band of said FM modulated luminance signal;

a Y/C recording mixer circuit including an adder circuit which adds the FM modulated luminance signal from said luminance signal recording processing circuit and the down converted chrominance signal from said chrominance signal recording processing circuit to provide a frequency multiplexed signal;

a recording amplifier circuit including an amplifier circuit which amplifies the frequency multiplexed signal from said Y/C recording mixer circuit to a power level necessary for recording said frequency multiplexed signal on a magnetic recording medium;

a recording head for receiving the amplified frequency multiplexed signal from said recording amplifier circuit and recording the amplified frequency multiplexed signal on the magnetic recording medium;

a reproducing head for reproducing the frequency multiplexed signal recorded on said magnetic recording medium;

a reproducing amplifier circuit including an amplifier circuit which amplifies a voltage of the reproduced frequency multiplexed signal from said reproducing head to a voltage level suitable for reproduction signal processing;

a luminance signal reproduction processing circuit including an FM demodulator circuit which receives the amplified reproduced frequency multiplexed signal from said reproducing amplifier circuit and frequency-separates therefrom at least the FM modulated luminance signal and demodulates the FM modulated luminance signal into a base band luminance signal, and a de-emphasis circuit which applies de-emphasis to the base band luminance signal;

an aspect ratio decider circuit for receiving one of the amplified reproduced frequency multiplexed signal from said reproducing amplifier circuit and the base band luminance signal from said luminance signal reproduction processing circuit, deciding which one of the two aspect ratios $a_1$ and $a_2$ the received signal is based on, and outputting a logical signal indicating a result of the decision;

a first clock signal generator circuit including a phase locked loop circuit responsive to the base band luminance signal from said luminance signal reproduction processing circuit to generate and output a first clock signal which is phase locked with a synchronization signal included in said base band luminance signal;

a second clock signal generator circuit including a circuit responsive to the first clock signal from said first clock signal generator circuit to generate and output second and third clock signals having frequencies related to each other by a ratio of $a_1:a_2$;

a counter circuit which counts the first clock signal from said first clock signal generator circuit, the counter circuit being reset in each of a plurality of horizontal periods of the base band luminance signal;

a luminance signal compression/expansion circuit for receiving the base band luminance signal from said luminance signal reproduction processing circuit, applying time compression/expansion processing to the base band luminance signal, and outputting a processed base band luminance signal, said luminance signal compression/expansion circuit receiving the logical signal from said aspect ratio decider circuit, the second and third clock signals from said second clock signal generator circuit, and an output signal of said counter circuit, wherein when said logical signal indicates that the signal receives by said aspect ratio decider circuit is based on the aspect ratio $a_1$, said luminance signal compression/expansion circuit uses said second and third clock signals in accordance with the output signal of said counter circuit to time-expand a horizontal center portion of the base band luminance signal by $a_1/a_2$, and during a blanking period of the base band luminance signal including the synchronization signal, to pass the base band luminance signal without subjecting it to compression/expansion, and when said logical signal indicates that the signal received by said aspect ratio decider circuit is based on the aspect ratio $a_2$, said luminance signal compression/expansion circuit one of (a) passes the base band luminance signal without subjecting it to compression/expansion and (b) passes the base band luminance signal without subjecting it to compression/expansion during the blanking period of the base band luminance signal including the synchronization signal and time-compresses the base band luminance signal by $a_2/a_1$ during a remaining period of the base band luminance signal;

a chrominance signal demodulator circuit including one of (a) a demodulator circuit which receives the amplified reproduced frequency multiplexed signal from said reproducing amplifier circuit and frequency-separates therefrom the down converted chrominance signal and demodulates the down converted chrominance signal into two base band color difference signals and (b) a demodulator circuit which receives the amplified reproduced frequency multiplexed signal from said reproducing amplifier circuit and frequency-separates therefrom the down converted reproduced chrominance signal and up converts the down converted chrominance signal back to the original frequency band of the chrominance signal and thereafter demodulates the up converted chrominance signal into two base band color difference signals;

a color difference signal compression/expansion circuit for receiving the two base band color difference signals from said chrominance signal demodulates circuit, applying time compression/expansion processing to the two base band color difference signals, and outputting two processed base band color difference signals, said color difference signal compression/expansion circuit receiving the logical signal from said aspect ratio decider circuit, the second and third clock signals from said second clock signal generator circuit, and the output signal of said counter circuit, wherein when said logical signal indicates that the signal received by said aspect ratio decider circuit is based on the aspect ratio $a_1$, said color difference signal compression/expansion circuit uses, in accordance with the output signal of said counter circuit, one of (a) said second and third clock signals and (b) fourth and fifth clock signals obtained by frequency dividing said second and third clock signals by a same frequency division ratio, to time-expand a horizontal center portion of each of the two base band color difference signals by $a_1/a_2$, and during the blanking period of the base band luminance signal, to pass the two base band color difference signals without subjecting them to compression/expansion, and when said logical signal indicates that the signal received by said aspect ratio decider circuit is based on the aspect ratio $a_2$, said color difference signal compression/expansion circuit one of (a) passes the two base band color difference signals without subjecting them to compression/expansion and (b) passes the two base band color difference signals without subjecting them to compression/expansion during the blanking period of the base band luminance signal the time-compresses the two base band color difference signals by $a_2/a_1$ during the remaining period of the base band luminance signal; and a chrominance signal modulator circuit including a modulator circuit which receives the two processed base band color difference signals from said color difference signal compression/expansion circuit and modulates the two processed base band color difference signals into a quadrature two-phase modulated signal including a chrominance sub-carrier signal.

2. A magnetic video recording/reproducing apparatus according to claim 1, wherein the chrominance sub-carrier signal is generated by one of frequency multiplying and dividing said first clock signal.

3. A magnetic video recording/reproducing apparatus having a recording circuit for recording two kinds of video signals based on different aspect ratios $a_1$ and $a_2$, where $a_1 > a_2$, and a reproduction circuit for reproducing recorded video signals, said apparatus comprising:

a Y/C separation circuit including a filter which receives a composite video signal to be recorded, separates from the composite video signal a luminance signal and a chrominance signal and outputs the luminance and chrominance signals;

a luminance signal recording processing circuit including a pre-emphasis circuit which receives the luminance signal from said Y/C separation circuit and applies pre-emphasis to at least the luminance signal and an FM modulator circuit which FM modulates the luminance signal to which pre-emphasis has been applied into an FM modulated luminance signal;

a chrominance signal recording processing circuit including a frequency converter circuit which receives the chrominance signal from said Y/C separation circuit and down converts said chrominance signal from an original frequency band of said chrominance signal to a lower frequency band within a frequency band of said FM modulated luminance signal;

a Y/C recording mixer circuit including an adder circuit which adds the FM modulated luminance signal from said luminance signal recording processing circuit and the down converted chrominance signal from said chrominance signal recording processing circuit to provide a frequency multiplexed signal;

a recording amplifier circuit including an amplifier circuit which amplifies the frequency multiplexed signal from said Y/C recording mixer circuit to a power level necessary for recording said frequency multiplexed signal on a magnetic recording medium;

a recording head for receiving the amplified frequency multiplexed signal from said recording amplifier circuit and recording the amplified frequency multiplexed signal on the magnetic recording medium;

a reproducing head for reproducing the frequency multiplexed signal recorded on said magnetic recording medium;

a reproducing amplifier circuit including an amplifier circuit which amplifies a voltage of the reproduced frequency multiplexed signal from said reproducing head to a voltage level suitable for reproduction signal processing;

a luminance signal reproduction processing circuit including an FM demodulator circuit which receives the amplified reproduced frequency multiplexed signal from said reproducing amplifier circuit and frequency-separates therefrom at least the FM modulated luminance signal and demodulates the FM modulated luminance signal into a base band luminance signal, and a de-emphasis circuit which applies de-emphasis to the base band luminance signal;

an aspect ratio decider circuit for receiving one of the amplified reproduced frequency multiplexed signal from said reproducing amplifier circuit and the base band luminance signal from said luminance signal reproduction processing circuit, deciding which one of the two aspect ratios $a_1$ and $a_2$ the received signal is based on, and outputting a logical signal indicating a result of the decision;

a first clock signal generator circuit including a phase locked loop circuit responsive to the base band luminance signal from said luminance signal reproduction processing circuit to generate and output a first clock signal which is phase locked with a synchronization signal included in said base band luminance signal;

a second clock signal generator circuit including a circuit responsive to the first clock signal from said clock signal generator circuit to generate and output second and third clock signals having frequencies related to each other by a ratio of $a_1:a_2$;

a counter circuit which counts the first clock signal from said first clock signal generator circuit, the counter circuit being reset in each of a plurality of horizontal periods of the base band luminance signal;

a third clock signal generator circuit for generating and outputting a sixth clock signal having a constant frequency which approximately equals a mean value of the frequency of the second clock signal from said second clock signal generator circuit and a seventh clock signal having a constant frequency which approximately equals a mean value of the frequency of the third clock signal from said second clock signal generator circuit;

a luminance signal compression/expansion circuit for receiving the base band luminance signal from said luminance signal reproduction processing circuit, applying time compression/expansion processing to the base band luminance signal using a memory having a capacity of at least one horizontal line of the base band luminance signal and outputting a processed base band luminance signal, said luminance signal compression/expansion circuit receiving the logical signal from said aspect ratio decider circuit, the second and third clock signals from said second clock signal generator circuit, the sixth and seventh clock signals from said third clock signal generator circuit, and an output signal of said counter circuit, wherein when said logical signal indicates that the signal received by said aspect ratio decider circuit is based on the aspect ratio $a_1$, said luminance signal compression/expansion circuit writes the base band luminance signal in said memory using the second and third clock signals in accordance with the output signal of said counter circuit and reads the base band luminance signal written in said memory from said memory using the seventh clock signal in accordance with the output signal of said counter circuit to time-expand a horizontal center portion of the base band luminance signal by $a_1/a_2$, and during a blanking period of the base band luminance signal including the synchronization signal, to pass the base band luminance signal without subjecting it to compression/expansion, and when said logical signal indicates that the signal received by said aspect ratio decider circuit is based on the aspect ratio $a_2$, said luminance signal compression/expansion circuit one of a (a) passes the base band luminance signal without subjecting it to compression/expansion and (b) writes the base band luminance signal in said memory using the second and third clock signals in accordance with the output signal of said counter circuit and reads the base band luminance signal written in said memory from said memory using the sixth clock signal in accordance with the output signal of said counter circuit to pass the base band luminance signal without subjecting it to compression/expansion during the blanking period of the base band luminance signal including the synchronization signal and time-compress the base band luminance signal by $a_2/a_1$ during a remaining period of the base band luminance signal;

a chrominance signal demodulator circuit including one of (a) a demodulator circuit which receives the amplified reproduced frequency multiplexed signal from said reproducing amplifier circuit and frequency-separates therefrom the down converted chrominance signal and demodulates the down converted chrominance signal into two base band color difference signals and (b) a demodulator circuit which receives the amplified reproduced frequency multiplexed signal from said reproducing amplifier circuit and frequency-separates therefrom the down converted reproduced chrominance signal and up converts the down converted chrominance signal back to the original frequency band of the chrominance signal and thereafter demodulates the up converted chrominance signal into two base color difference signals;

a color difference signal compression/expansion circuit for receiving the two base band color difference signals from said chrominance signal demodulator circuit, applying time compression/expansion processing to the two base band color difference signals using a memory having a capacity of at least one horizontal line of each of the two base band color difference signals and outputting two processed base band color difference signals, said color difference signal compression/expansion circuit receiving the logical signal from said aspect ratio decider circuit, the second and third clock signals from said second clock signal generator circuit, the sixth and seventh clock signals from said third clock signal generator circuit, and the output signal of said counter circuit, wherein when said logical signal indicates that the signal received by said aspect ratio decider circuit is based on the aspect ratio $a_1$, said color difference signal compression/expansion circuit writes the two base band color difference signals in said memory using, in accordance with the output signal of said counter circuit, one of (a) said second and third clock signals and (b) fourth and fifth clock signals obtained by frequency dividing said second and third clock signals by a frequency division ratio k, and reads the two base band color difference signals written in said memory from said memory using, in accordance with the output signal of said counter circuit, one of (a) said seventh clock signal and (b) a ninth clock signal obtained by frequency dividing said seventh clock signal by the frequency division ratio k, to time-expand a horizontal center portion of each of the two base band color difference signals by $a_1/a_2$, and during the blanking period of the base band luminance signal, to pass the two base band color difference signals without subjecting them to compression/expansion, and when said logical signal indicates that the signal received by said aspect ratio decider circuit is based on the aspect ratio $a_2$, said color difference signal compression/expansion circuit one of (a) passes the two base band color difference signals without subjecting them to compression/expansion and (b) writes the two base band color difference signals in said memory using one of (a) the second and third clock signals and (b) the fourth and fifth clock signals, in accordance with the output signal of said counter circuit and reads the two base band color difference signals written in said memory from said memory using one of (a) said sixth clock signal and (b) an eighth clock signal obtained by frequency dividing said sixth clock signal by said frequency division ratio k, in accordance with the output signal of said counter circuit, to pass the two base band color difference signals without subjecting them to compression/expansion during the blanking period of the base band luminance signal and to time-compress the two base band color difference signals by $a_2/a_1$ during the remaining period of the base band luminance signal; and a chrominance signal modulator circuit including a modulator circuit which receives the two processed base band color difference signals from said color difference signal compression/expansion circuit and modulates the two processed base band color difference signals into a quadrature two-phase modulated signal including a chrominance sub-carrier signal.

4. A magnetic video recording/reproducing apparatus according to claim 1, wherein the aspect ratios $a_1$ and $a_2$ are $a_1 = 16:9$ and $a_2 = 4:3$.

5. A magnetic video recording/reproducing apparatus according to claim 4, wherein said second and third clock signals have frequencies of one of (a) 24/5 fsc and 18/5 fsc, (b) 32/7 fsc and 24/7 fsc, and (c) 64/13 fsc and 48/13 fsc, wherein fsc is a frequency of the chrominance sub-carrier signal.

6. A magnetic video recording/reproducing apparatus according to claim 1, wherein said luminance signal recording processing circuit processes the two kinds of video signals based on the aspect ratios $a_1$ and $a_2$ in a same manner, and said chrominance signal recording processing circuit processes the two kinds of video signals based on the aspect ratios $a_1$ and $a_2$ in a same manner.

7. A magnetic video recording/reproducing apparatus having a recording circuit for recording two kinds of video signals based on different aspect ratios $a_1$ and $a_2$, where $a_1 > a_2$, and a reproduction circuit for reproducing recorded video signals, said apparatus comprising:

- a Y/C separation circuit including a filter which receives a composite video signal to be recorded, separates from the composite video signal a luminance signal and a chrominance signal and outputs the luminance and chrominance signals;
- a luminance signal recording processing circuit including a pre-emphasis circuit which receives the luminance signal from said Y/C separation circuit and applies pre-emphasis to at least the luminance signal and an FM modulator circuit which FM modulates the luminance signal to which pre-emphasis has been applied into an FM modulated luminance signal;
- a chrominance signal recording processing circuit including a frequency converter circuit which receives the chrominance signal from said Y/C separation circuit and down converts said chrominance signal from an original frequency band of said chrominance signal to a lower frequency band within a frequency band of said FM modulated luminance signal;
- a Y/C recording mixer circuit including an adder circuit which adds the FM modulated luminance signal from said luminance signal recording processing circuit and the down converted chrominance signal from said chrominance signal recording processing circuit to provide a frequency multiplexed signal;
- a recording amplifier circuit including an amplifier circuit which amplifies the frequency multiplexed signal from said Y/C recording mixer circuit to a power level necessary for recording said frequency multiplexed signal on a magnetic recording medium;
- a recording head for receiving the amplified frequency multiplexed signal from said recording amplifier circuit and recording the amplified frequency multiplexed signal on the magnetic recording medium;
- a reproducing head for reproducing the frequency multiplexed signal recorded on said magnetic recording medium;
- a reproducing amplifier circuit including an amplifier circuit which amplifies a voltage of the reproduced frequency multiplexed signal from said reproducing head to a voltage level suitable for reproduction signal processing;
- a luminance signal reproduction processing circuit including an FM demodulator circuit which receives the amplified reproduced frequency multiplexed signal from said reproducing amplifier circuit and frequency-separates therefrom at least the FM modulated luminance signal and demodulates the FM modulated luminance signal into a base band luminance signal, and a de-emphasis circuit which applies de-emphasis to the base band luminance signal;
- an aspect ratio decider circuit for receiving one of the amplified reproduced frequency multiplexed signal from said reproducing amplifier circuit and the base band luminance signal from said luminance signal reproduction processing circuit, deciding which one of the two aspect ratios $a_1$ and $a_2$ the received signal is based on, and outputting a logical signal indicating a result of the decision;
- a first clock signal generator circuit including an oscillator circuit for generating and outputting a first clock signal having a constant frequency which is an integer multiple of a horizontal synchronization frequency of the base band luminance signal;
- a second clock signal generator circuit including a circuit responsive to the first clock signal from said first clock signal generator circuit to generate and output second and third clock signals having frequencies related to each other by a ratio of $a_1:a_2$;
- counts the first clock signal from said first clock signal generator circuit, the counter circuit being reset in each of a plurality of horizontal periods of the base band luminance signal;
- a luminance signal compression/expansion circuit for receiving the base band luminance signal from said luminance signal reproduction processing circuit, applying time compression/expansion processing to the base band luminance signal, and outputting a processed base band luminance signal, said luminance signal compression/expansion circuit receiving the logical signal from said aspect ratio decider circuit, the second and third clock signals from said second clock signal generator circuit, and an output signal of said counter circuit, wherein when said logical signal indicates that the signal received by said aspect ratio decider circuit is based on the aspect ratio $a_1$, said luminance signal compression/expansion circuit uses said second and third clock signals in accordance with the output signal of said counter circuit to time-expand a horizontal center portion of the base band luminance signal by $a_1/a_2$, and during a blanking period of the base band luminance signal including a synchronization signal, to pass the base band luminance signal without subjecting it to compression/expansion, and when said logical signal indicates that the signal received by said aspect ratio decider circuit is based on the aspect ratio $a_2$, said luminance signal compression/expansion circuit one of (a) passes the base band luminance signal without subjecting it to compression/expansion and (b) passes the base band luminance signal without subjecting it to compression/expansion during the blanking period of the base band luminance signal including the synchronization signal and time-compresses the base band luminance signal by $a_2/a_1$ during a remaining period of the base band luminance signal;

a chrominance signal demodulator circuit including one of (a) a demodulator circuit which receives the amplified reproduced frequency multiplexed signal from said reproducing amplifier circuit and frequency-separates therefrom the down converted chrominance signal and demodulates the down converted chrominance signal into two base band color difference signals and (b) a demodulator circuit which receives the amplified reproduced frequency multiplexed signal from said reproducing amplifier circuit and frequency-separates therefrom the down converted chrominance signal and up converts the down converted chrominance signal back to the original frequency band of the chrominance signal and thereafter demodulates the up converted chrominance signal into two base band color difference signals;

a color difference signal compression/expansion circuit for receiving the two base band color difference signals from said chrominance signal demodulator circuit, applying time compression/expansion processing to the two base band color difference signals, and outputting two processed base band color difference signals, said color difference signal compression/expansion circuit receiving the logical signal from said aspect ratio decider circuit, the second and third clock signals from said second clock signal generator circuit, and the output signal of said counter circuit, wherein when said logical signal indicates that the signal received by said aspect ratio decider circuit is based on the aspect ratio $a_1$, said color difference signal compression/expansion circuit uses, in accordance with the output signal of said counter circuit, one of (a) said second and third clock signals and (b) fourth and fifth clock signals obtained by frequency dividing said second and third clock signals by a same frequency division ratio, to time-expand a horizontal center portion of each of the two base band color difference signals by $a_1/a_2$, and during the blanking period of the base band luminance signal, to pass the two base band color difference signals without subjecting them to compression/expansion, and when said logical signal indicates that the signal received by said aspect ratio decider circuit is based on the aspect ratio $a_2$, said color difference signal compression/expansion circuit one of (a) passes the two base band color difference signals without subjecting them to compression/expansion and (b) passes the two base band color difference signals without subjecting them to compression/expansion during the blanking period of the base band luminance signal and time-compresses the two base band color difference signals by $a_2/a_1$ during the remaining period of the base band luminance signal; and a chrominance signal modulator circuit including a modulator circuit which receives the two processed base band color difference signals from said color difference signal compression/expansion circuit and modulates the two processed base band color difference signals into a quadrature two-phase modulated signal including a chrominance sub-carrier signal.

8. A magnetic video recording/reproducing apparatus according to claim 7, wherein the aspect ratios $a_1$ and $a_2$ are $a_1 = 16:9$ and $a_2 = 4:3$.

9. A magnetic video recording/reproducing apparatus according to claim 8, wherein said second and third clock signals have frequencies of one of (a) 24/5 fsc and 18/5 fsc, (b) 32/7 fsc and 24/7 fsc, and (c) 64/13 fsc and 48/13 fsc, wherein fsc is a frequency of the chrominance sub-carrier signal.

10. A magnetic video recording/reproducing apparatus according to claim 7, wherein said luminance signal recording processing circuit processes the two kinds of video signals based on the aspect ratios $a_1$ and $a_2$ in a same manner, and said chrominance signal recording processing circuit processes the two kinds of video signals based on the aspect ratios $a_1$ and $a_2$ in a same manner.

11. A magnetic video recording/reproducing apparatus according to claim 3, wherein the aspect ratios $a_1$ and $a_2$ are $a_1 = 16:9$ and $a_2 = 4:3$.

12. A magnetic video recording/reproducing apparatus according to claim 3, wherein said luminance signal recording processing circuit processes the two kinds of video signals based on the aspect ratios $a_1$ and $a_2$ in a same manner, and said chrominance signal recording processing circuit processes the two kinds of video signals based on the aspect ratios $a_1$ and $a_2$ in a same manner.

13. A magnetic video recording/reproducing apparatus according to claim 1, further comprising means for enabling the luminance and chrominance signals from the Y/C separation circuit to be subjected to time compression/expansion processing by the luminance signal compression/expansion circuit and the color difference signal compression/expansion circuit, respectively, when the magnetic video recording/reproducing apparatus is not performing at least one of a recording operation and a reproducing operation.

14. A magnetic video recording/reproducing apparatus according to claim 3, further comprising means for enabling the luminance and chrominance signals from the Y/C separation circuit to be subjected to time compression/expansion processing by the luminance signal compression/expansion circuit and the color difference signal compression/expansion circuit, respectively, when the magnetic video recording/reproducing apparatus is not performing at least one of a recording operation and a reproducing operation.

15. A magnetic video recording/reproducing apparatus according to claim 7, further comprising means for enabling the luminance and chrominance signals from the Y/C separation circuit to be subjected to time compression/expansion processing by the luminance signal compression/expansion circuit and the color difference signal compression/expansion circuit, respectively, when the magnetic video recording/reproducing apparatus is not performing at least one of a recording operation and a reproducing operation.

16. A magnetic video recording/reproducing apparatus comprising:

wide aspect ratio decoding means for decoding a received video signal to output a wide aspect ratio video signal having an aspect ratio which is greater than an aspect ratio of a conventional video signal if the received video signal is a wide aspect ratio video signal, and for outputting the received video signal without converting the aspect ratio of the received video signal if the received video signal is a conventional video signal;

recording means for recording the output video signal from the wide aspect ratio decoding means on a magnetic video tape;

reproducing means for reproducing the video signal recorded on the magnetic video tape to produce a reproduced video signal having an aspect ratio which is the same as the aspect ratio of the recorded video signal;

aspect ratio detecting means for detecting the aspect ratio of the reproduced video signal;

aspect ratio converting means responsive to the aspect ratio detecting means for converting the reproduced video signal to a converted video signal having an aspect ratio which is different from the aspect of the reproduced video signal;

first output means for outputting the reproduced video signal; and second output means for outputting the converted video signal.

17. A magnetic video recording/reproducing apparatus according to claim 1, wherein the recording head and the reproducing head are the same head.

18. A magnetic video recording/reproducing apparatus according to claim 3, wherein the recording head and the reproducing head are the same head.

19. A magnetic video recording/reproducing apparatus according to claim 8, wherein the recording head and the reproducing head are the same head.

* * * * *